United States Patent
Damghanian et al.

(10) Patent No.: US 11,570,435 B2
(45) Date of Patent: Jan. 31, 2023

(54) VIDEO CODING COMPRISING UNIFORM TILE SPLIT WITH REMAINDER

(71) Applicant: Telefonaktiebolaget LM Ericsson (publ), Stockholm (SE)

(72) Inventors: Mitra Damghanian, Upplands-Bro (SE); Martin Pettersson, Vallentuna (SE); Rickard Sjöberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/050,691

(22) PCT Filed: Jan. 16, 2020

(86) PCT No.: PCT/SE2020/050037
§ 371 (c)(1),
(2) Date: Oct. 26, 2020

(87) PCT Pub. No.: WO2020/149783
PCT Pub. Date: Jul. 23, 2020

(65) Prior Publication Data
US 2021/0152824 A1    May 20, 2021

Related U.S. Application Data

(60) Provisional application No. 62/793,353, filed on Jan. 16, 2019.

(51) Int. Cl.
*H04N 19/119*    (2014.01)
*H04N 19/122*    (2014.01)
(Continued)

(52) U.S. Cl.
CPC ......... *H04N 19/119* (2014.11); *H04N 19/122* (2014.11); *H04N 19/167* (2014.11);
(Continued)

(58) Field of Classification Search
CPC .... H04N 19/70; H04N 19/167; H04N 19/122; H04N 19/119; H04N 19/96; H04N 19/172; H04N 19/176
See application file for complete search history.

(56) References Cited

U.S. PATENT DOCUMENTS 9,602,829 B2 *   3/2017   Araki .................. H04N 19/174
10,009,616 B2    6/2018   Minezawa et al.
(Continued)

FOREIGN PATENT DOCUMENTS

RU    2 683 165 C1    3/2019

OTHER PUBLICATIONS

Ikai, Tomohiro et al., "Request for flexible unit size tile with implementation friendly restriction", Joint Video Experts Team (JVET) of ITU-T SG 16 WP3 and ISO/IEC JTC 1/SC 29/WG 11, Document: JVET-M0875_r1, 13th Meeting: Marrakech, MA, Jan. 2019 (14 pages).
(Continued)

*Primary Examiner* — Neil R Mikeska
(74) *Attorney, Agent, or Firm* — Rothwell, Figg, Ernst & Manbeck, P.C.

(57) ABSTRACT

Method for decoding a picture, comprising: decoding information that the picture is partitioned into more than one segment based on one or more syntax elements in a bitstream; decoding information that the spatial segmentation is uniform based on the one or more syntax elements; determining a segment unit size based on the one or more syntax elements or based on a predefined segment unit size; decoding a first value indicating a segment width from one or more code words in the bitstream; decoding a second value indicating a segment height from the one or more code words; deriving segment column widths based on a picture width in number of segment units and the first value;
(Continued)

deriving segment row heights based on a picture height in number of segment units and the second value; deriving a spatial location for a current block based on the derived segment column widths and the derived segment heights; and decoding the current block based on the derived spatial location.

18 Claims, 16 Drawing Sheets

(51) Int. Cl.
   *H04N 19/167* (2014.01)
   *H04N 19/172* (2014.01)
   *H04N 19/176* (2014.01)
   *H04N 19/70* (2014.01)
   *H04N 19/96* (2014.01)

(52) U.S. Cl.
   CPC ......... *H04N 19/172* (2014.11); *H04N 19/176* (2014.11); *H04N 19/70* (2014.11); *H04N 19/96* (2014.11)

(56) References Cited

U.S. PATENT DOCUMENTS

| | | | | |
|---|---|---|---|---|
| 10,142,653 | B2* | 11/2018 | Yamamoto | H04N 19/187 |
| 10,750,170 | B2* | 8/2020 | Kim | H04N 19/105 |
| 10,827,186 | B2* | 11/2020 | Moccagatta | H04N 19/463 |
| 2004/0194950 | A1* | 10/2004 | Restarick | E21B 17/04 166/66 |
| 2010/0158401 | A1* | 6/2010 | Shiraishi | H04N 19/70 382/243 |
| 2012/0163453 | A1* | 6/2012 | Horowitz | H04N 19/82 375/240.12 |
| 2012/0320970 | A1* | 12/2012 | Drugeon | H04N 19/61 375/240.02 |
| 2014/0086333 | A1* | 3/2014 | Wang | H04N 21/8451 375/240.25 |
| 2014/0301657 | A1* | 10/2014 | Hattori | H04N 19/593 382/239 |
| 2014/0334539 | A1* | 11/2014 | Kim | H04N 19/13 375/240.03 |
| 2015/0016543 | A1 | 1/2015 | Rapaka et al. | |
| 2015/0203084 | A1 | 7/2015 | Zhu et al. | |
| 2017/0118540 | A1* | 4/2017 | Thomas | H04N 19/167 |
| 2018/0041610 | A1 | 2/2018 | Denoual et al. | |
| 2018/0242028 | A1 | 8/2018 | Brandenburt et al. | |
| 2019/0020851 | A1* | 1/2019 | Abe | H04N 19/70 |
| 2019/0238860 | A1* | 8/2019 | Lim | H04N 13/161 |
| 2020/0195924 | A1* | 6/2020 | Hsiang | H04N 19/167 |

OTHER PUBLICATIONS

Tsai, Chia-Yang et al., "AHG4/AHG9: Syntax modifications for tile width constraint", Mediatek JCTVC-J0042, Presented by Shawmin Lei 10th JCT-VC Meeting in Stockholm, Jul. 2012 (14 pages).

International Search Report and Written Opinion issued in International Application No. PCT/SE2020/050037 dated Apr. 24, 2020 (15 pages).

Mitra Damghanian et al., "AHG12: On uniform tile spacing", Joint Video Experts Team (JVET) of ITU-T SG 16 WP 3 and ISO/IEC JTC 1/SC 29/WG 11, Document; JVET-M0375-v1, 14th Meeting: Marrakesh, MA Jan. 9-18, 2019 (5 pages).

Yasugi Y et al, "AHG12: Flexible Tile Splitting", Joint Video Experts Team (JVET) of ITU-T SG 16 WP 3 and ISO/IEC JTC 1/SC 29/WG 11, Document: JVET-L0359_r4, 12th Meeting: Macao, CN, Oct. 3-12, 2018 (6 pages)s.

Sjöberg R et al., "AHG112: On Uniform Tile Partitioning", Joint Video Experts Team (JVET) of ITU-T SG 16 WP 3 and ISO/IEC JTC 1/SC 29/WG 11, Document: JVET-N0498, 14th Meeting: Geneva, CH, Mar. 19-27, 2019 (7 pages).

Arild Fuidseth, "Tiles", Joint Collaborative Team on Video Coding (JCT-VC) of ITU-T SG16 WP3 and ISO/IEC JTC1/SC29/WG11, Document: JCTVC-E408 rl, 5th Meeting: Geneva, CH, Mar. 16-23, 2011 (16 pages).

Recommendation ITU-T H.265, High efficiency video coding, Apr. 2013 (4 pages).

\* cited by examiner ctuRsAddr =

| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |

FIG. 2A ctuRsAddr =

| 0 | 1 | 2 | 3 | 4 | 5 |
|---|---|---|---|---|---|
| 6 | 7 | 8 | 9 | 10 | 11 |
| 12 | 13 | 14 | 15 | 16 | 17 |
| 18 | 19 | 20 | 21 | 22 | 23 |

FIG. 2B

| | HEVC uniform tile spacing | Proposed uniform tile spacing in Embodiment 1 |
|---|---|---|
| ------ Tile boundaries<br>......... Only CTU boundaries<br>▬▬ Moved tile boundaries compared to the original picture<br>░░░ Removed parts | | |
| Tiles in the original picture | | |
| Uniform tile spacing after removing the left most columns of tiles | | |
| Uniform tile spacing after removing the right most columns of tiles | | |
| Uniform tile spacing after removing the left most and right most columns of tiles | | |

VIDEO CODING COMPRISING UNIFORM TILE SPLIT WITH REMAINDER

CROSS REFERENCE TO RELATED APPLICATION(S)

This application is a 35 U.S.C. § 371 National Stage of International Patent Application No. PCT/SE2020/050037, filed on Jan. 16, 2020, designating the United States, and claiming priority to U.S. provisional patent application No. 62/793,353, filed on Jan. 16, 2019. The above identified applications are incorporated by this reference.

TECHNICAL FIELD

This disclosure relates to High Efficiency Video Coding (HEVC) and Versatile Video Coding (VVC).

BACKGROUND

HEVC and the next generation video coding

High Efficiency Video Coding (HEVC), a.k.a. H.265, is a block-based video codec standardized by ITU-T and MPEG that utilizes both temporal and spatial prediction. Spatial prediction is achieved using intra (I) prediction from within the current picture. Temporal prediction is achieved using inter (P) or bi-directional inter (B) prediction on block level from previously decoded reference pictures. The difference between the original pixel data and the predicted pixel data, referred to as the residual, is transformed into the frequency domain, quantized and then entropy coded before transmitted together with necessary prediction parameters such as prediction mode and motion vectors, also entropy coded. By quantizing the transformed residuals, a tradeoff between bitrate and quality of the video may be controlled. The level of quantization is determined by a quantization parameter (QP). The decoder performs entropy decoding, inverse quantization, and inverse transformation to obtain the residual. The decoder then then adds the residual to an intra prediction or an inter prediction to reconstruct a picture.

MPEG and ITU-T is working on the successor to HEVC within the Joint Video Exploratory Team (JVET). The name of this video codec under development is VCC.

Slices

The concept of slices in HEVC divides the picture into independently coded slices, where each slice is read in raster scan order in units of coding tree units (CTUs). Different coding types could be used for slices of the same picture, i.e. a slice could either be an I-slice, P-slice or B-slice. The main purpose of slices is to enable resynchronization in case of data loss.

Tiles

The HEVC video coding standard includes a tool called tiles that divides a picture into rectangular spatially independent regions. Using tiles, a picture in HEVC can be partitioned into rows and columns of samples where a tile is an intersection of a row and a column. The tiles in HEVC are always aligned with CTU boundaries.

FIGS. 1A and 1B show an example of a tile partitioning using 4 tile rows and 5 tile columns resulting in a total of 20 tiles for the picture.

The tile structure is signaled in the picture parameter set (PPS) by specifying the thicknesses of the rows and the widths of the columns. Individual rows and columns can have different sizes, but the partitioning always span across the entire picture, from left to right and top to bottom respectively. There is no decoding dependency between tiles of the same picture. This includes intra prediction, context selection for entropy coding and motion vector prediction. One exception is that in-loop filtering dependencies are generally allowed between tiles.

The PPS syntax used for specifying the tile structure in HEVC is listed Table 1 below. A flag, e.g., tiles_enabled_flag, indicates whether tiles are used or not. If the flag is set, the number of tiles columns and rows are specified. The uniform_spacing_flag is a flag specifying whether the column widths and row heights are explicitly signaled or whether a pre-defined method to space the tile borders evenly should be used. If explicit signaling is indicated, the column widths are signaled one-by-one followed by the row heights. Such column widths and row heights are signaled in CTU units. The loop_filter_across_tiles_enabled_flag flag specifies whether in-loop filters across tile boundaries are turned on or off for all tile boundaries in the picture.

TABLE 1

Exemplary tile syntax in HEVC

| | Descriptor |
|---|---|
| pic_parameter_set_rbsp( ) { | |
| ... | |
| tiles_enabled_flag | u(1) |
| ... | |
| if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|         for( i = 0; i < num_tile_columns_minus1; i++ ) | |
|             column_width_minus1[ i ] | ue(v) |
|         for( i = 0; i < num_tile_rows_minus1; i++ ) | |
|             row_height_minus1[ i ] | ue(v) |
|     } | |
|     loop_filter_across_tiles_enabled_flag | u(1) |
| } | |
| ... | |

The semantics for specifying the tile structure in HEVC are explained in further detail below:

tiles_enabled_flag equal to 1 specifies that there is more than one tile in each picture referring to the PPS. tiles_enabled_flag equal to 0 specifies that there is only one tile in each picture referring to the PPS.

num_tile_columns_minus1 plus 1 specifies the number of tile columns partitioning the picture. num_tile_columns_minus1 shall be in the range of 0 to PicWidthInCtbsY−1, inclusive. When not present, the value of num_tile_columns_minus1 is inferred to be equal to 0.

num_tile_rows_minus1 plus 1 specifies the number of tile rows partitioning the picture. num_tile_rows_minus1 shall be in the range of 0 to PicHeightInCtbsY−1, inclusive. When not present, the value of num_tile_rows_minus1 is inferred to be equal to 0.

When tiles_enabled_flag is equal to 1, num_tile_columns_ minus1 and num_tile_rows_minus1 shall not be both equal to 0.

uniform_spacing_flag equal to 1 specifies that tile column boundaries and likewise tile row boundaries are distributed uniformly across the picture. uniform_spacing_flag equal to 0 specifies that tile column boundaries and likewise tile row boundaries are not distributed uniformly across the picture but signalled explicitly using the syntax elements column_width_minus1[i] and row_height_minus1[i]. When not present, the value of uniform_spacing_flag is inferred to be equal to 1.

column_width_minus1[i] plus 1 specifies the width of the i-th tile column in units of CTBs.

row_height_minus1[i] plus 1 specifies the height of the i-th tile row in units of CTBs.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter and sample adaptive offset filter operations. When not present, the value of loop_filter_across_tiles_enabled_flag is inferred to be equal to 1.

VVC is expected not to use traditional slices as in HEVC. Instead, tiles are expected to play a larger role in VVC due to increased demand for spatial random access from video services including VR streaming.

The concept of tile groups was agreed to be included in the current VVC draft at the last JVET meeting. A tile group is used to group multiple tiles to reduce the overhead of each tile.

A tile group in the current VVC draft may be rectangular and consist of M×N tiles, where M is the number of tiles vertically and N the number of tiles horizontally.

Uniform tile partitioning in HEVC

HEVC tile partitioning requires that all tile boundaries are aligned with the CTU grid. It means that all tiles consist of full CTUs and the only incomplete CTUs allowed in the tiles are the ones located in the right or bottom edge of the picture. In HEVC, the syntax element uniform_spacing_flag equal to 1 specifies that tile column boundaries and likewise tile row boundaries are distributed uniformly across the picture. However, this uniformity is limited by the CTU granularity. In HEVC, the list colWidth[i] for i ranging from 0 to num_tile_columns_minus1, inclusive, specifies the width of the i-th tile column in units of coding tree blocks (CTBs) and is derived as the following equation (A):

```
if( uniform_spacing_flag )
    for( i = 0; i <= num_tile_columns_minus1; i++ )
        colWidth[ i ] = ( ( i + 1 ) * PicWidthInCtbsY ) / ( num_tile_columns_minus1 + 1 )
                        − ( i * PicWidthInCtbsY ) / ( num_tile_columns_minus1 + 1 )
```

A similar equation (B) is used for determining the heights of the tile rows (rowHeight[i]):

```
if( uniform_spacing_flag )
    for( j = 0; j <= num_tile_rows_minus1; j++ )
        rowHeight[ j ] = ( ( j + 1 ) * PicHeightInCtbsY ) / ( num_tile_rows_minus1 + 1 ) −
                         ( j * PicHeightInCtbsY ) / ( num_tile_rows_minus1 + 1 )
```

Flexible Tile Splitting

Flexible tile splitting, introduced in JVET-K0155, followed by JVET-L0359, provides the functionality to split a picture into partitioning tiles where the width or height of each tile is a multiple of a unit size finer than the CTU size. Flexible tile splitting allows the use of incomplete CTUs in the right and bottom edge of every tile (rather than only the right and bottom edge of the picture). FIGS. 2A-2B provides examples for a 2×2 tile segmentation using flexible tile splitting as in JVET-L0359 where the tile unit size is a quarter of the CTU size.

In FIGS. 2A-2B, tiles are shown by thick black lines and CTUs are shown by thin black lines. FIG. 2A shows the HEVC method with 20 CTUs in the picture. FIG. 2B shows the proposed method in JVET-L0359, with 24 CTUs in the picture and the tile unit size equal to a quarter of the CTU size, shown by dashed gray lines.

Flexible tile splitting may be useful for applications such as load balancing and 360° video with face sizes desired not to be a multiple of the CTU size.

The syntax and semantics from JVET-L0359 relevant to the current disclosure are listed below, where the italicized portions are the added text proposed in L0359.

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   tiles_enabled_flag | u(1) |
|   if( tiles_enabled_flag ) { | |
|     tile_unit_size_idc | ue(v) |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |

-continued

| | Descriptor |
|---|---|
|         column_width_minus1[ i ] | ue(v) |
|       for( i = 0; i < num_tile_rows_minus1; i++ ) | |
|         row_height_minus1[ i ] | ue(v) |
|     } | |
|     loop_filter_across_tiles_enabled_flag | u(1) |
|   } | |
|   rbsp_trailing_bits( ) | |
| } | | tile_unit_size_idc specifies the size of a tile unit block in luma samples. The variables TileUnitSizeY, PicWidthInTileUnitsY and PicHeightInTileUnitsY are derived as follows;

```
TileUnitSizeY = Max (CtbSizeY >> ( tile_unit_size_idc ), 8 )                    (7-14)
PicWidthInTileUnitsY = Ceil( pic_width_in_luma_samples ÷ TileUnitSizeY )        (7-14)
PicHeightInTileUnitsY = Ceil( pic_height_in_luma_samples ÷ TileUnitSizeY )      (7-14)
If tiles_enabled_flag is equal to 1, the variables PicWidthInCtbsY,
PicHeightInCtbsY, PicSizeInCtbsY are modified as follows:
for(PicWidthInCtbsY = 0, i = 0; i < = num_tile_columns_minus1; i++ )
    PicWidthInCtbsY += Ceil( colWidth[ i ] * TileUnitSizeY ÷ CtbSizeY )         (7-14)
for(PicHeightInCtbsY = 0, j = 0; j < = num_tile_rows_minus1; j++ )
    PicHeightInCtbsY += Ceil(rowHeight[ j ] * TileUnitSizeY ÷ CtbSizeY )        (7-14)
    PicSizeInCtbsY = PicWidthInCtbsY * PicHeightInCtbsY                         (7-14)
``` num_tile_columns_minus1 plus 1 specifies the number of tile columns partitioning the picture in units of tile unit blocks. num_tile_columns_minus1 shall be in the range of 0 to PicWidthInTileUnitsY−1, inclusive. When not present, the value of num_tile_columns_minus1 is inferred to be equal to 0.

num_tile_rows_minus1 plus 1 specifies the number of tile rows partitioning the picture in units of tile unit blocks. num_tile_rows_minus1 shall be in the range of 0 to PicHeightInTileUnitsY−1, inclusive. When not present, the value of num_tile_rows_minus1 is inferred to be equal to 0.

The variable NumTilesInPic is derived as follows:

NumTilesInPic=(num_tile_columns_minus1+1)* (num_tile_rows_minus1+1)

The list colWidth[i] for i ranging from 0 to num_tile_columns_minus1, inclusive, specifying the width of the i-th tile column in units of tile unit blocks, is derived as follows:

```
if( uniform_spacing_flag )
    for( i = 0; i <= num_tile_columns_minus1; i++ )
        posR = ( ( i + 1 ) * PicWidthInTileUnitsY ) / ( num_tile_columns_minus1 + 1 )
        posL = ( i * PicWidthInTileUnitsY ) / (num_tile_columns_minus1 + 1 )
        colWidth[ i ] = min(PicWidthInTileUnitsY − posL, posR posL)
else {
    colWidth[ num_tile_columns_minus1 ] = PicWidthInTileUnitsY                  (6-3)
    for( i = 0; i < num_tile_columns_minus1; i++ ) {
        colWidth[ i ] = column_width_minus1[ i ] + 1
        colWidth[ num_tile_columns_minus1 ] −= colWidth[ i ]
    }
}
```

The list rowHeight[j] for j ranging from 0 to num_tile_rows_minus1, inclusive, specifying the height of the j-th tile row in units of tile unit blocks, is derived as follows.

```
if( uniform_spacing_flag )
    for(j = 0; j <= num_tile_rows_minus1; j++ )
        posB = (( j + 1 ) * PicHeightInTileUnitsY) / (num_tile_rows_minus1 + 1)
        posT = (j * PicHeightInTileUnitsY) / (num_tile_rows_minus1 + 1)
        rowHeight [j] = min(PicHeightInTileUnitsY − posT, posB − posT)
else {
```

```
rowHeight[ num_tile_rows_minus1 ] = PicHeightInTileUnitsY    (6-4)
for( j = 0; j < num_tile_rows_minus1; j++ ) {
    rowHeight[ j ] = row_height_minus1[ j ] + 1
    rowHeight[ num_tile_rows_minus1 ] = rowHeight[ j ]
    }
}
```

The list TileColX[i] for i ranging from 0 to num_tile_columns_minus1+1, inclusive, specifying the X location of the top-left luma sample of the i-th tile column in units of luma samples, is derived as follows:

```
for ( TileColX[ 0 ] = 0, i = 0; i <= num_tile_columns_minus1; i++ )
    TileColX[ i + 1 ] = TileColX[ i ] + colWidth[ i ] * TileUnitSizeY
```

The list TileRowY[j] for j ranging from 0 to num_tile_rows_minus1+1, inclusive, specifying the Y location of the top-left luma sample of the j-th tile row in units of luma samples, is derived as follows:

```
for ( TileRowY[ 0 ] = 0, j = 0; j <= num_tile_rows_minus1; j++ )
    TileRowY[ j + 1 ] = TileRowY[ j ] + rowHeight[ j ] *
    TileUnitSizeY
```

Segment Groups, Segments and Units

Segment groups, segments, and units are now described. The term segment is used as a more general term than tiles, since the solutions in the current disclosure may be applied to different kinds of picture partitioning schemes and not only tile partitions known from HEVC and the VVC draft. In the current disclosure, a tile is one embodiment of a segment, but there may also be other embodiments of segments.

FIG. 3 shows a picture (10) of a video stream and an exemplary partitioning of the picture into units (8), segments (11) and segment groups (12). FIG. 3 (a) shows a picture (10) that consists of 64 units (8). FIG. 3 (b) shows the segment partition structure (13) of the same picture (10) consisting of 16 segments (11). The partition structure (13) is shown by dashed lines. Each segment (11) consists of a number of units. A segment can either consist of an integer number of complete units or a combination of complete and partial units. A number of segments form a segment group. FIG. 3 (c) shows the segment group partitioning of the same picture (10) which consists of 8 segment groups. The segment group may consist of segments in raster scan order. Alternatively, the segment group may consist of any group of segments that together form a rectangle. Alternatively, the segment group may consist of any subset of segments.

FIG. 4 shows a picture (10) where the dashed lines show a partition structure dividing the picture into four segments. FIG. 4 also shows three units (16, 17, 18). As shown in the figure, two units (16, 17) belong to one current segment (15) and one unit (18) belongs to a different, neighboring segment (14). The segments are independent with respect to other segments, which means that segment boundaries are handled similar to picture boundaries when decoding the units. This affects the derivation process of elements during decoding such as, for example, the derivation of intra prediction modes and the derivation of quantization parameter values.

Intra modes are well known in the current art and are used and signaled for units that only use prediction from previously decoded samples of the current picture for sample prediction. It is common that the derivation of the intra prediction mode in a current unit (16) depends on previously derived intra prediction modes in other, neighboring units (17). With segments being independent, the derivation of the intra prediction mode in a current unit (16) may only depend on previously derived intra prediction modes in units (17) that belong to the current segment (15) and may not depend on any intra prediction mode in any unit (18) that belongs to a different segment (14).

This means that the partition structure in FIG. 4 makes the intra prediction modes in units (18) in a different segment (14) unavailable for the derivation of the intra prediction mode for the units (16) in a current segment (15). Note that the mode in some units (18) in a different segment may well have been used for derivation of an intra prediction mode in a unit (16) in a current segment (15) if those units would have belonged to the same segment. Instead, the segment boundary may have the same effect on intra mode derivation as a picture boundary for the units (16) in a current segment (15).

In the context of the current disclosure, a segment may be a tile or a slice and a segment group may be a tile group. In the current disclosure, the term "tile" and "segment" may be used interchangeably. In some embodiments, a unit may be equivalent to a CTU.

SUMMARY

According to the HEVC equations (A) and (B), the tile column widths (and row heights) are calculated by subtracting two terms from each other in the form of $\lfloor (i+1) \cdot k \rfloor - \lfloor i \cdot k \rfloor$ where i is a non-negative integer and k is a rational number with numerator equal to PicWidthInCtbsY and denominator equal to num_tile_columns_minus1+1. The output of such calculation when k is not an integer, may be equal to $\lfloor k \rfloor$ or $\lceil k \rceil$ depending on the values of k and i. This inherent feature causes variations as big as one CTU in tile column width and tile row height sizes. In the context of the current disclosure, such variations are referred to as the tile size ripple (See Table 2 below for some examples). The pattern for this ripple is not constant and depends on the width of the picture in CTU and number of tile columns and rows which give the value of k, and the positioning of the tile on the tile grid determined by i. Some examples of the ripples in the tile column width using HEVC tile partitioning with uniform_spacing_flag equal to 1 are illustrated in Table 2. The same examples can be applied to tile row heights as well.

| PicWidth-InCtbsY | num_tile_columns_minus1 | k | colWidth[ i ], i=0, 1, ... , num_tile_columns_minus1 |
|---|---|---|---|
| 8 | 2 | 8/3 | 2, 3, 3 (smaller tile starts the grid) (shown in FIG. 1C) |
| 10 | 3 | 10/4 | 2, 3, 2, 3 (mixed tile sizes) (shown in FIG. 1D) |

-continued

| PicWidth-InCtbsY | num_tile_columns_minus1 | k | colWidth[ i ], i=0, 1, ... , num_tile_columns_minus1 |
|---|---|---|---|
| 100 | 30 | 100/31 | 3, 3, 3, 3, 4, 3, 3, 3, 4, 3, 3, 3, 4, 3, 3, 3, 4, 3, 3, 3, 3, 4, 3, 3, 3, 4, 3, 3, 3, 4 (irregular mix of tile sizes) |

Table 2 shows tile column width calculated using HEVC tile partitioning with uniform_spacing_flag equal to 1 and given values for PicWidthInCtbsY and num_tile_columns_minus1. Ripples in the values of colWidth[i] are visible.

This inconsistency in the final tile sizes is undesirable as due to a need to investigate the details of the input values and the code to predict the final tile size values. The ripple issue can happen in both horizontal and vertical directions. This makes it more difficult to determine the correct horizontal and vertical sizes of a particular tile in the tile grid without examining the details.

Another problem is that in the current implementation of HEVC for uniform spacing of the tiles, if some rows or columns of tiles in the picture are removed, the tile boundaries inside the remaining part of the picture might move according to a new ripple pattern. This will require recalculating the tile size and addresses in the tile extraction process. An example illustrated in FIG. 5 as Table 500 shows how the tile column boundaries and so tile sizes might change in HEVC uniform tile spacing if some tiles are extracted from the original picture when the uniform_spacing_flag is equal to 1. The tile boundaries that change in case of removing some tile column(s) compared to the tile boundaries in the original picture are shown in bold lines.

Table 500 in FIG. 5 illustrates tile boundaries using HEVC uniform tile spacing. Internal tile boundaries change between the original picture and after removing some tiles from the original picture. Parameters for the original picture are set as follows: uniform_spacing_flag=1, PicWidthInCtbsY=10, num_tile_columns_minus1=3, num_tile_rows_minus1=1.

JVET-L0359 proposes flexible tile splitting which allows for finer tile unit size granularity by providing the possibility to use incomplete CTUs in the right and bottom edge of every tile (rather than only the right and bottom edge of the picture). FIG. 2 provides an example for a 2×2 tile segmentation using flexible tile splitting as in JVET-L0359 where the tile unit size is a quarter of the CTU size and uniform_spacing_flag is equal to 1.

As proposed in JVET-L0359, if uniform_spacing_flag is equal to 1, widths of the tile columns are determined using the following equation:

```
if( uniform_spacing_flag )
    for( i = 0; i <= num_tile_columns_minus1; i++ )
        posR = ( ( i + 1 ) *
            PicWidthInTileUnitsY ) / ( num_tile_columns_minus1 + 1 )
        posL = ( i * PicWidthInTileUnitsY ) /
            ( num_tile_columns_minus1 + 1 )
        colWidth[ i ] = min(PicWidthInTileUnitsY - posL,
            posR - posL)
where:
    PicWidthInTileUnitsY = Ceil( pic_width_in_luma_samples ÷
    TileUnitSizeY )
```

A similar equation is used for determining the heights of the tile rows (rowHeight[i]).

The above implementation shows that the ripple problem also exists for JVET-L0359 proposal. The introduced possibility for defining tile size with a granularity finer than the CTU granularity introduces yet another artifact of inconsistent tile sizes as described here. Using the algorithm proposed in L0359, the tile partitioning does not stay consistent for some picture width and tile unit size values when the tile unit size changes e.g. into half or quarter. The reason is that the proposed equation for uniform tile splitting in L0359 allows for different tile unit sizes while it does not regularize the arrangement of the slightly larger or smaller tiles in the tile grid. Table 3 below shows some examples for the cases that the picture size is fixed, and the tile unit size is changed e.g. divided into half or quarter using the flexible tile splitting proposed in L0359. The final tile column widths flip as a result of the change in the tile unit size in a way that sometimes the larger tile width is on the left side and sometimes on the right side of the picture. This unpredictability is not desired.

TABLE 3

| Picture width (in luma samples) | Tile unit size | PicWidthInTileUnitsY | num_tile_columns_minus1 | k | colWidth[ i ], i=0, 1, ..., num_tile_columns_minus1 (in tile unit size) | colWidth[ i ], i=0, 1, ..., num_tile_columns_minus1 (in luma samples) |
|---|---|---|---|---|---|---|
| 2160 | 32 | Ceil(67.5) = 68 | 1 | 68/2 | 34, 34 | 1072, 1088 Smaller tile starts the grid |
|  | 16 | 135 | 1 | 135/2 | 67, 68 | 1088, 1072 Larger tile starts the grid |
| 1080 | 16 | Ceil(67.5) = 68 | 1 | 68/2 | 34, 34 | 544, 536 Larger tile starts the grid |
|  | 8 | 135 | 1 | 135/2 | 67, 68 | 536, 544 Smaller tile starts the grid |
| 480 | 128 | Ceil(3.75) = 4 | 1 | 4/2 | 2, 2 | 256, 224 Larger tile starts the grid |
|  | 32 | 15 | 1 | 15/2 | 7, 8 | 224, 256 Smaller tile starts the grid |

Table 3 shows tile column width calculated using the flexible tile splitting as in L0359 when uniform_spacing_flag is set to 1.

We can conclude that a rule for organizing the inconsistency of the rounding effect on the tile sizes will make it easy to determine the final tile sizes without the need for a detailed investigation of the code and input values. A systematic approach for regularizing the tile size ripples will also give consistent tile partitioning results for the original picture and a subset of the tiles from the original picture.

A separate problem is that the tiles resulting from uniform tile split can vary significantly in size. In Table 600 shown in FIG. 6, for example, the Tiles in the original picture for HEVC uniform tile spacing have 4 different sizes with the smallest being 2×3 CTUs and the largest one being 3×4 CTUs.

A solution is proposed herein which regularizes the ripples on the size of the segments with a preferred order when the segment sizes cannot be exact according to the limited granularity of the division. In the proposed solution, tiles with slightly smaller or larger sizes according to the rounding effect have a preferred arrangement. In one embodiment, the tile widths in a left to right scan direction, will only stay the same or decrease. The proposed solution disclosed herein may be applied to the tile column width and/or tile row height in a tile grid or to the width and height of individual tiles. In one embodiment, the tiles with slightly larger sizes (due to the given granularity and the rounding effect) locate in the top-left part of the picture and the tiles with slightly smaller sizes locate in the bottom-right part of the picture.

In alternative solutions, methods are proposed herein for uniform tiles in which the resulting tile sizes have equal sizes as far as it is possible.

Accordingly, in one aspect there is provided a method for decoding a picture. The method includes decoding information that the picture is partitioned into more than one segment based on one or more syntax elements in a bitstream. The method also includes decoding information that the spatial segmentation is uniform based on the one or more syntax elements in the bitstream. The method also includes determining a segment unit size based on the one or more syntax elements or based on a predefined segment unit size. The method also includes decoding a first value indicating a segment width from one or more code words in the bitstream. The method also includes decoding a second value indicating a segment height from the one or more code words in the bitstream. The method also includes deriving segment column widths based on a picture width in number of segment units and the first value. The method also includes deriving segment row heights based on a picture height in number of segment units and the second value. The method also includes deriving a spatial location for a current block based on the derived segment column widths and the derived segment row heights. The method also includes decoding the current block based on the derived spatial location.

The proposed solution keeps the width of the current tile independent of the previous tiles but only on the remaining number of units (in the column or row) that are going to be partitioned into the remaining number of tiles. As a result, the proposed solution for uniform spacing of tiles keeps the tile partitioning intact for the extracted and remaining tiles if tiles are extracted. This will remove the need for recalculating the tile sizes in case of a picture split or tile extraction. In the current implementation of HEVC for uniform spacing of the tiles, if some rows or columns of tiles in the picture are removed, the ripple pattern might change and the tile boundaries inside the remaining part of the picture might move according to the new ripple pattern.

Consistency is another advantage of the proposed solution. The proposed solution for uniform spacing of the tiles organizes the tile sizes (e.g. tile column width and the tile row height) and provides a rule for the final arrangement of tile sizes without any detailed investigation of the input parameters or the code. For instance, in one embodiment of the proposed solution when the picture width/height in tile unit is not divisible by the number of tile columns/rows, then all the tiles rounded to larger sizes are found on the left/top part of the picture. The proposed solution also regulates ripples of the tile sizes in uniform tile spacing in case of changes to the tile unit size.

The proposed method also reduces complexity compared to HEVC and flexible tile split proposed in JVET-L0359. The proposed method has no multiplication and only 1 division per iteration for determining the widths of the tile columns and the heights of the tile rows, while the HEVC method uses 2 multiplications and 2 divisions per iteration.

In alternative solutions, the resulting tile sizes are uniform as far as it is possible.

BRIEF DESCRIPTION OF THE DRAWINGS

The accompanying drawings, which are incorporated herein and form part of the specification, illustrate various embodiments.

FIG. 2A shows tile segmentation using HEVC tile partitioning—

FIG. 2B shows tile segmentation using flexible tile splitting.

FIG. 6 shows a table according to some embodiments.

DETAILED DESCRIPTION

Figure 1A:
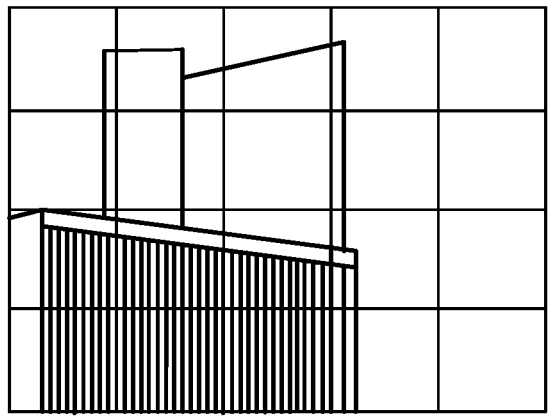
FIGS. 1A and 1B an example of tile partitioning according to one embodiment.
Figure 1B:
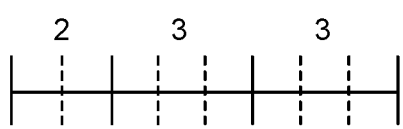
Figure 1C:
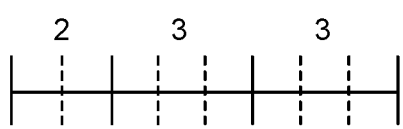
FIGS. 1C and 1D show tile sizes according to one embodiment.
Figure 1D:
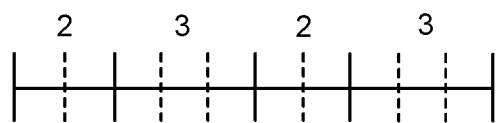
Figure 3:
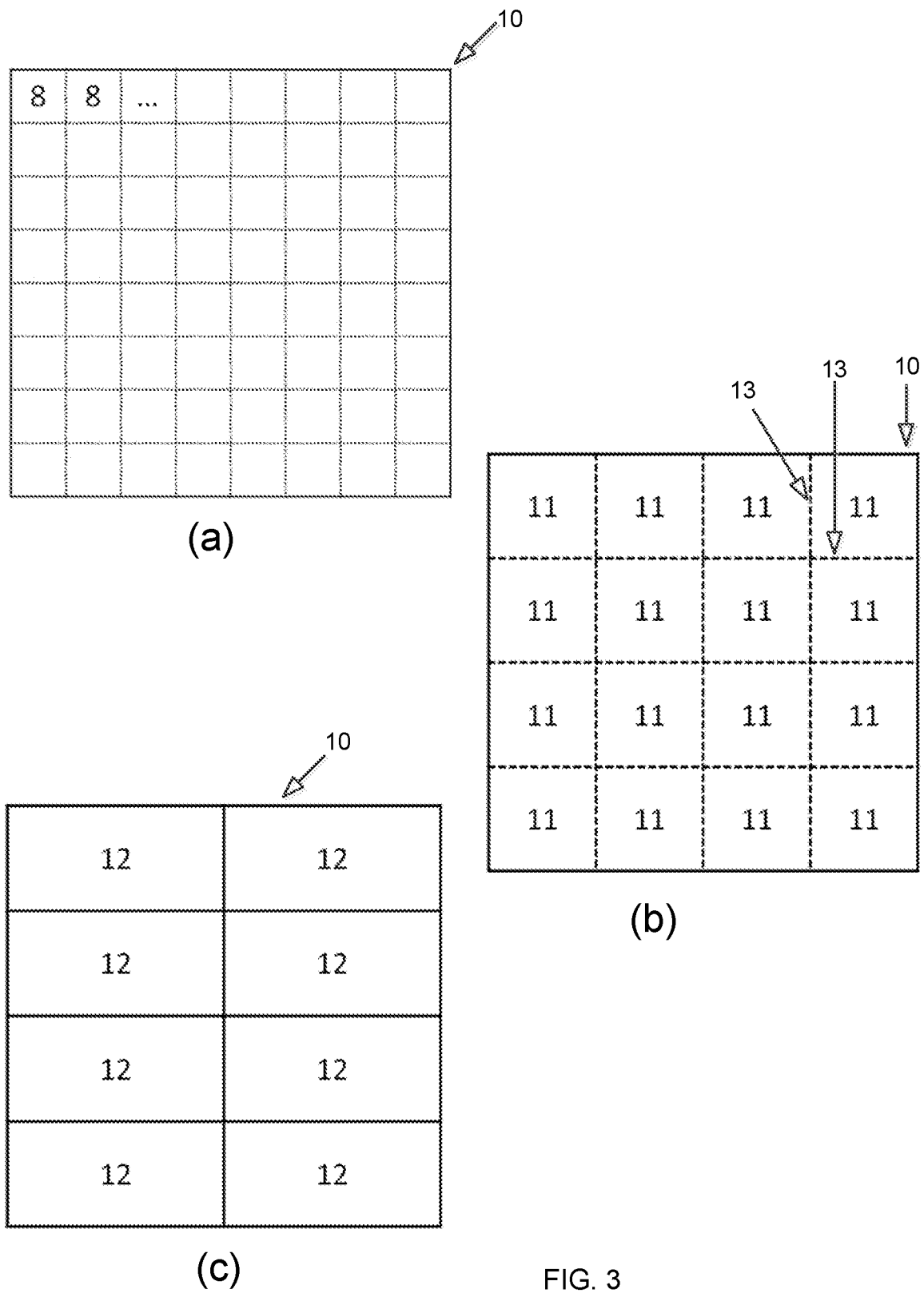
FIG. 3 shows a picture of a video stream and exemplary partitioning.
Figure 4:
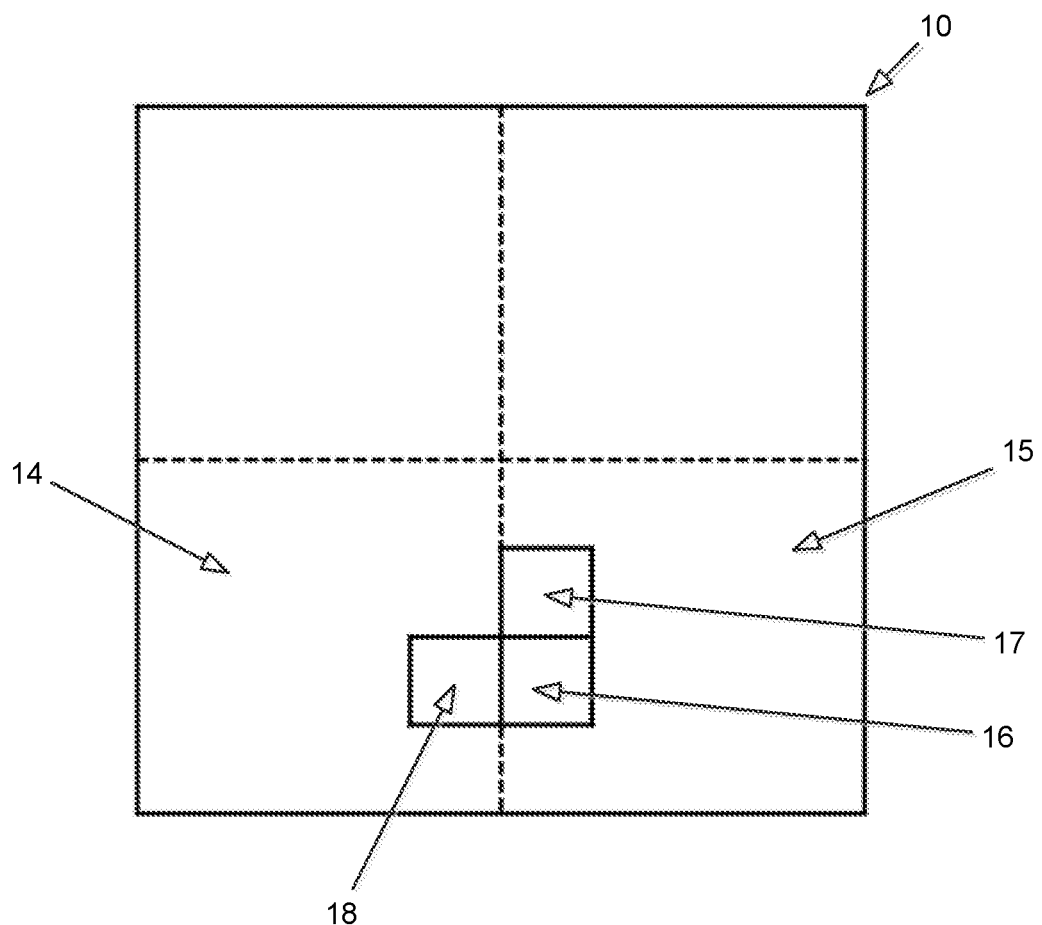
FIG. 4 shows a picture according to some embodiments.
Figure 5:
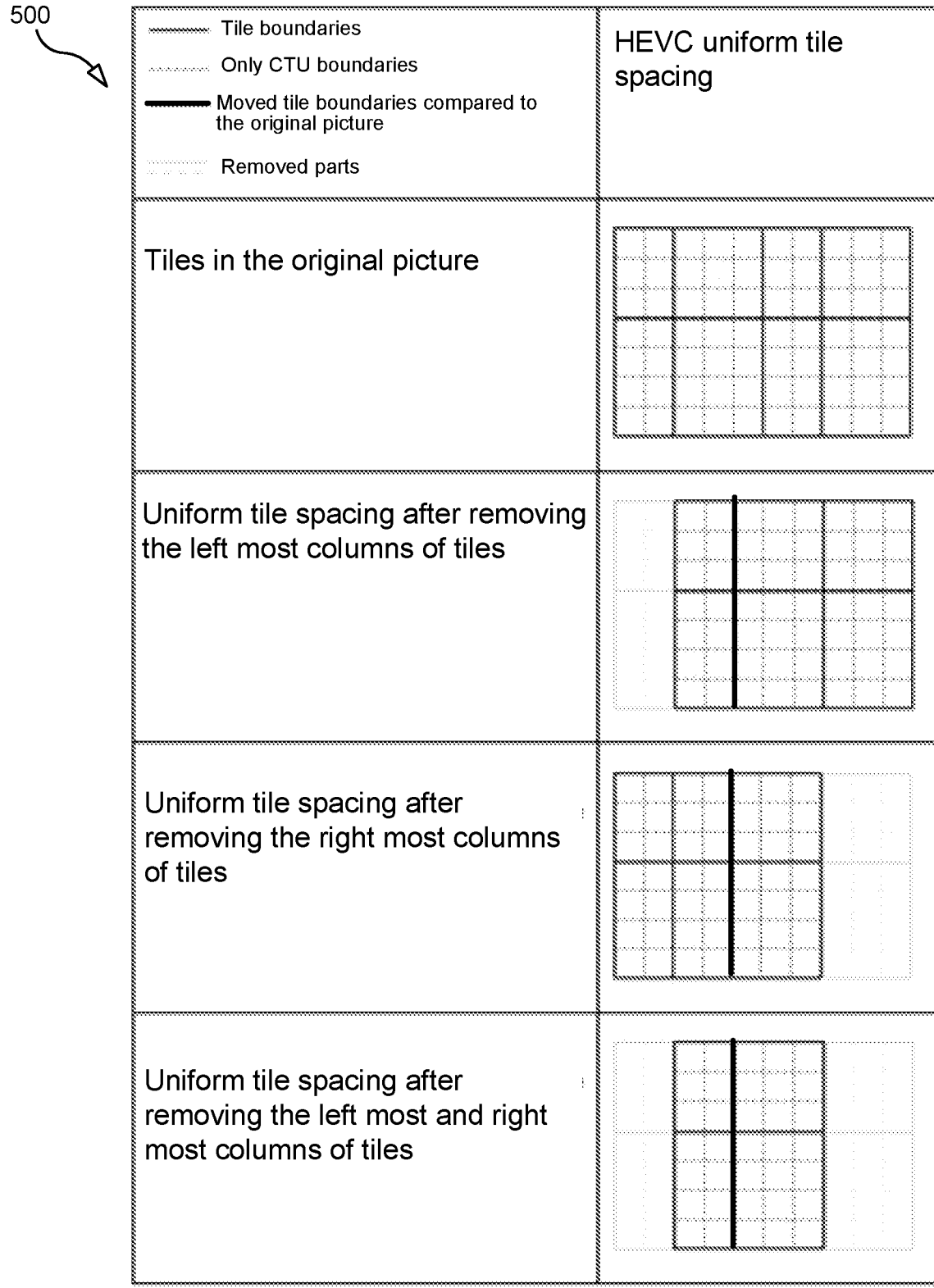
FIG. 5 shows a table according to some embodiments.

The following terminology has been used to describe the embodiments:

Arithmetic operator "/" is used for integer division with truncation of the result toward zero. For example, 7/4 and −7/−4 are truncated to 1 and −7/4 and 7/−4 are truncated to −1.

Arithmetic operator "÷" is used for division in mathematical equations where no truncation or rounding is intended.

Ceil(x) gives the smallest integer greater than or equal to x.

Floor(x) gives the largest integer less than or equal to x.

The terms "tile column width" and "tile width" are used interchangeably which means the solution can be applied when the tile column widths are being calculated in a tile grid or when the tile widths are being calculated individually (e.g. if there is no tile grid).

The terms "tile row height" and "tile height" are used interchangeably which means the solution can be applied when the tile row heights are being calculated in a tile grid or when the tile heights are being calculated individually (e.g. if there is no tile grid).

According to some embodiments, the proposed solution disclosed herein for defining the width (and equivalently the height) of the tiles for uniform_spacing_flag=1 has the following elements:

- in the loop for defining the width of each tile, the width for the tile is defined using the available remaining unit sizes which means the number of unit sizes in the row which are not yet allocated to a tile;
- the number of remaining unit sizes is then divided by the number of remaining tiles in the row;
- the obtained tile size is rounded towards the larger or smaller integer (Ceil( ) or Floor( ) functions) according to the given rule for ordering the width of the tiles; and
- an optional element to recalculate the number of remaining unit sizes (e.g. CTUs) in every iteration of the loop for defining the width of each tile.

The same elements apply to defining the height of the tiles.

The proposed solution disclosed herein describes a decoder method for decoding a picture 10 from a bitstream, the method comprising deriving the sizes and/or locations for all segments in the picture from the bitstream, wherein the picture 10 consists of a number of units 8 and a partition structure 13 partitions the picture into at least two segments 11 and the decoder determines that the spatial segmentation is uniform by decoding one or more code words in the bitstream, and the decoder determines the number of spatial segments by decoding one or more code words in the bitstream, and the decoder determines a tile unit size, and the partitioning of the segments to uniform widths or heights follows a fixed ripple pattern independent from the number of the spatial segments, and the derivation of the segment sizes is done in a loop over the number of segments, where inside the loop the number of remaining tile units to be segmented and the number of remaining segments are calculated.

In one example, the proposed solution replaces the following HEVC lines:

```
if( uniform_spacing_flag )
    for( i = 0; i <= num_tile_columns_minus1; i++ )
        colWidth[ i ] = ( ( i + 1 ) * PicWidthInCtbsY ) /
        ( num_tile_columns_minus1 + 1 ) −
            ( i * PicWidthInCtbsY ) / ( num_tile_columns_minus1 + 1 )
``` with the following lines:

```
if( uniform_spacing_flag ){
            A = PicWidthInCtbsY
            B = num_tile_columns_minus1 + 1
    for( i = 0; i <= num_tile_columns_minus1; i++ ){
        colWidth[ i ] = Ceil( A ÷ B )
                A −= colWidth[ i ]
                B −= 1
        }
    }
```

The proposed method also reduces complexity compared to HEVC and flexible tile split proposed in JVET-L0359. The proposed method has no multiplication and only 1 division per iteration for determining the widths of the tile columns and the heights of the tile rows, while the HEVC method uses 2 multiplications and 2 divisions per iteration.

Embodiment 1. Monotonic Ripple

In an embodiment, the width of the segments in a row or the height of the segments in a column is never in ascending or never in descending order following a predefined scan direction. The segment may be a tile in a picture and so the tile sizes are monotonic (never ascending or never descending) in a scan direction. For example, for tile widths to be never ascending in the left to right scan direction means that the width of a tile is never larger than the width of another tile on the same row which is spatially located to the left of the first tile.

In the first embodiment, for a never ascending tile column width (left to right scan direction) and tile row height (top to bottom scan direction) on top of HEVC, the following HEVC functions:

```
if( uniform_spacing_flag )
    for( i = 0; i <= num_tile_columns_minus1; i++ )
        colWidth[ i ] = ( ( i + 1 ) * PicWidthInCtbsY ) /
        ( num_tile_columns_minus1 + 1 ) −
            ( i * PicWidthInCtbsY ) / ( num_tile_columns_minus1 + 1 )
and
if( uniform_spacing_flag )
    for( j = 0; j <= num_tile_rows_minus1; j++ )
        rowHeight[ j ] = ( (j + 1 ) * PicHeightInCtbsY ) /
        ( num_tile_rows_minus1 + 1 ) −
            ( j * PicHeightInCtbsY ) / ( num_tile_rows_minus1 + 1 )
```

```
if( uniform_spacing_flag ) {
            A = PicWidthInCtbsY
            B = num_tile_columns_minus1 + 1
    for( i = 0; i <= num_tile_columns_minus1; i++ ) {
        colWidth[ i ] = Ceil( A ÷ B)
                A −= colWidth[ i ]
                B −= 1
        }
    }
and
if( uniform_spacing_flag ) {
            C = PicHeightInCtbsY
            D = num_tile_rows_minus1 + 1
    for( j = 0; j <= num_tile_rows_minus1; j++ ) {
        rowHeight[ j ] = Ceil( C ÷ D)
                C −= rowHeight [ j ]
                D −= 1
        }
    }
```

The resulting values in the colWidth and rowHeight lists are in units of luma coding tree block. If for instance the CTU size is equal to 128×128, the values are in units of 128 luma samples such that a value of 2 means 256 luma samples.

The colWidth and rowHeight lists are then used by the decoder to determine the scan order of blocks in the picture. When block data is decoded, the spatial position of a block is based on the values in the colWidth and rowHeight lists. The decoder may construct conversion lists from tile scan addresses to raster scan addresses and the other way around using the values in colWidth and rowHeight. A decoder may then use the conversion lists during decoding to determine the spatial positions of blocks. In HEVC, conversion lists are used and called CtbAddrRsToTs and CtbAddrTsToRs.

FIG. 6 shows table 600 which compares the tile size allocation for HEVC and the above exemplary implementation of the first embodiment. As shown in table 600, in the proposed solution, the tile boundaries are kept the same as the original picture when tile columns are removed from the left or right or both sides of the picture. The rounding effect is governed to put the slightly wider tiles on the left side of the picture in all cases using the Ceil(function and recalculating the number of the remaining tile units in every iteration of the loop over tiles to determine tile column widths.

Table 600 shows how the internal tile boundaries change after removing some tile columns from the original picture using HEVC uniform tile spacing while the internal tile boundaries are kept intact in our proposed solution. The parameters for the original picture are set as follows: uniform_spacing_flag=1, PicWidthInCtbsY=10, num_tile_columns_minus1=3, num_tile_rows_minus1=1.

Below is another example of the first embodiment, built on top of the equations proposed in JVET-L0359 which supports tile size granularities smaller than the CTU size. The following equation changes are proposed on top of JVET-L0359:

```
if( uniform_spacing_flag ) {
    A = PicWidthInTileUnitsY
        B = num_tile_columns_minus1 + 1
    for( i = 0; i <= num_tile_columns_minus1; i++ ) {
        ──────── posR = ( ( i + 1 ) * PicWidthInTileUnitsY ) / ( num_tile_columns_minus1 + 1 )
        ──────── posL = ( i * PicWidthInTileUnitsY ) / ( num_tile_columns_minus1 + 1 )
        ──────── colWidth[ i ] = min(PicWidthInTileUnitsY - posL, posR - posL)
        colWidth[ i ] = Ceil( A ÷ B )
                    A -= colWidth[ i ]
                    B -= 1
    }
}
where:
    PicWidthInTileUnitsY =
    Ceil( pic_width_in_luma_samples ÷ TileUnitSizeY )
``` and equivalently for the tile row heights the following changes are proposed:

```
if( uniform_spacing_flag ) {
    C = PicHeightInTileUnitsY
    D = num_tile_rows_minus_1 + 1
    for(j = 0; j <= num_tile_rows_minus1; j++ ) {
        ──────── posB = ( ( i + 1 ) * PicHeightInTileUnitsY ) / ( num_tile_rows_minus1 + 1 )
        ──────── posT = ( i * PicHeightInTileUnitsY ) / ( num_tile_rows_minus1 + 1 )
        ──────── rowHeight[ i ] = min(PicHeightInTileUnitsY - posT, posB - posT)
        rowHeight[ j ] = Ceil( C ÷ D )
        C -= rowHeight[ j ]
        D -= 1
    }
}
where:
        PicHeightInTileUnitsY = Ceil( pic_height_in_luma_samples ÷
TileUnitSizeY )
```

The resulting values in the colWidth and rowHeight lists are in units of luma tile units. If for instance the tile unit size is equal to 32×32, the values are in units of 32 luma samples such that a value of 2 means 64 luma samples.

Table 4 compares the results for the width of the tiles between JVET-L0359 and the proposed solution in Embodiment 1 for different picture widths values. The results for JVET-L0359 show inconsistency in the width of the tile columns (colWidth[i]) when the tile unit size changes while the proposed solution in Embodiment 1 provides consistent width of the tile columns (colWidth[i]) when the tile unit size changes as it consistently prioritizes the slightly larger tiles to be put on the left side of the picture.

TABLE 4

| Picture width (in luma samples) | Tile unit size | PicWidthInTileUnitsY | JVET-L0359 colWidth[ i ], i=0, 1 (in tile unit size) | JVET-L0359 colWidth[ i ], i=0, 1 (in luma samples) | First Embodiment colWidth[ i ], i=0, 1 (in tile unit size) | First Embodiment colWidth[ i ], i=0, 1 (in luma samples) |
|---|---|---|---|---|---|---|
| 2160 | 32 | Ceil(67.5) = 68 | 34, 34 | 1072, 1088 Smaller tile starts the grid | 34, 34 | 1088, 1072 Larger tile starts the grid |
|  | 16 | 135 | 67, 68 | 1088, 1072 Larger tile starts the grid | 68, 67 | 1088, 1072 Larger tile starts the grid |
| 1080 | 16 | Ceil(67.5) = 68 | 34, 34 | 544, 536 Larger tile starts the grid | 34, 34 | 544, 536 Larger tile starts the grid |
|  | 8 | 135 | 67, 68 | 536, 544 Smaller tile starts the grid | 68, 67 | 544, 536 Larger tile starts the grid |
| 480 | 128 | Ceil(3.75) = 4 | 2, 2 | 256, 224 Larger tile starts the grid | 2, 2 | 256, 224 Larger tile starts the grid |
|  | 32 | 15 | 7, 8 | 224, 256 Smaller tile starts the grid | 8, 7 | 256, 224 Larger tile starts the grid |

Table 4 shows tile column width calculated when uniform_spacing_flag=1, num_tile_columns_minus1=1, using the flexible tile splitting as in JVET-L0359 compared with the proposed solution in the first embodiment.

In the first embodiment, a decoder may perform all or a subset of the following steps:

1. Decode information that one or more pictures are partitioned into more than one segment from one or more syntax elements in the bitstream. The syntax is preferably located in a picture parameter set. The syntax may specify a number R indicating the number of segment rows and a number C indicating the number of segment columns.

2. Decode information that the spatial segmentation is uniform from one or more syntax elements in the bitstream. The syntax is preferably located in a picture parameter set. The syntax may consist of a one-bit flag specifying whether the spatial segmentation is uniform or not.

3. Determine a segment unit size S either from one or more syntax elements or by using a predefined segment unit size. If a predefined unit size is used, it may be equal to the size of a CTU or the size of a CTU in one dimension. For instance, if the CTU size is equal to 128×128, the segment unit size S may be equal to 128 (or 128×128).

4. Calculate the size of the picture in number of segment units. The calculation may be done separate for the height and width of the picture such that the horizontal size (HS) is set equal to the picture width in luma samples divided by the segment unit size S. The vertical size (VS) may be set equal to the picture height in luma samples divided by the segment unit size.

5. Derive the width and heights of all segments from the number of segments in the picture and the segment unit size S. The derivation is done in a loop over the number of segments where the number of segments yet to be segmented and the size of the picture yet to be segmented in number of segment units is updated in each iteration of the loop.

The derivation may be done in two separate loops:
  a. Derive the segment column widths from the picture width in number of tile units and the number of segment columns C by the following substeps:
    i. Set the picture width yet to be segmented (A) equal to the value HS
    ii. Set the number of segment columns yet to be segmented (B) equal to the value C
    iii. Derive the column widths in a loop where one width value is derived per iteration and where the number of segment columns yet to be segmented (B) and the picture width yet to be segmented (A) are both updated in each iteration. The iteration may be executed C times.
      1. The derived column width W may be set equal to Ceil(A÷B)
      2. The variable A may then be updated to A-W and the variable B may be updated to B-1
  b. Derive the segment row heights from the picture height in number of tile units and the number of segment rows R by the following substeps:
    i. Set the picture height yet to be segmented (A) equal to the value VS
    ii. Set the number of segment rows yet to be segmented (B) equal to the value R
    iii. Derive the row heights in a loop where one height value is derived per iteration and where the number of segment rows yet to be segmented (B) and the picture height yet to be segmented (A) are both updated in each iteration. The iteration may be executed R times.
      1. The derived row height H may be set equal to Ceil(A÷B)
      2. The variable A may then be updated to A-H and the variable B may be updated to B-1

6. Derive the spatial location for a current block using derived segment widths and derived segment heights.

7. Decode the current block using the derived spatial location. Store the decoded sample values for the current block in memory at memory positions corresponding to the derived spatial location.

In a variant of this embodiment, the function Ceil( ) can be replaced by function Floor( ), in only horizontal, or only vertical or both directions.

In a variant of this embodiment, a flag may choose between the two functions Ceil( ) and Floor( ). In some embodiments, there may be two independent flags for the horizontal and vertical directions.

Embodiment 2. Specified Order

In the second embodiment, the width of the segments in a row or the height of the segments in a column follows a specified order. This specified order may be signaled in the bitstream using a template pattern in the form of a sequence of bits. Segments may be tiles in a picture and so in this embodiment, the shape of the preferred ripple on the tile sizes is specified. For example, all slightly wider tiles are in the left side of the picture. This may be done by a template pattern expressed in the form of a sequence of bits that specifies Ceil( ) or Floor( ) function in every iteration of the loop over tiles to specify the tile width (or height). Function Ceil(may be represented by 1 and function Floor( ) may be represented by 0 in the template bit sequence. As an example, template 110 would specify Ceil( ) function in the first two tiles and function Floor( ) in the third iteration of the loop for specifying the tile size. The pattern may be periodically repeated if the number of tiles is larger than the length of the template bit sequence.

Embodiment 3. Binary Tile Splits

In the third embodiment, the binary segment split with an explicit ordering of the segment width or height is applied to the width or height of the picture. Segments may be tiles in a picture and so the binary partitioning is used for partitioning the picture into $2^n$ tiles with uniform tile sizes. A predefined ripple pattern (as in the second embodiment) may be used in combination with this embodiment. The binary partitioning may carry on hierarchically until the algorithm reaches the specified number of segments or only up to a defined number of steps and the rest of the segment divisions being carried out by other methods. As an example, the total size is divided by 2 in a first step where it is specified to assign the smaller or larger segment to the left or right. In each of the subsequent steps, each of the left and right segments are divided into two parts using the next binary partitioning level and the specified rule for the position of possibly smaller or larger segment.

Embodiment 4. Default Ordering of the Ripple

In the fourth embodiment, the width of the segments in a row or the height of the segments in a column of a picture follows a specified default order for the width or height of the segments. Segments may be tiles in a picture and so a default preferred ordering is defined for managing the ripples in the segment sizes. The default ripple pattern may be signaled in the bitstream. In a variant of this embodiment the default pattern may be overwritten. In another variant of this embodiment a flag can specify if the default ordering or another specified ordering is being used.

Embodiment 5

In the fifth embodiment, the aim is to achieve as many large equally sized tiles by using a uniform spacing method.

This may be achieved by decoding a TileWidth value from one or more code words in the bitstream. Then the width values of all tile columns in the picture except one is set equal to the decoded TileWidth value. The width value of the one remaining tile column is set equal to the picture width value minus the sum of the width values of all tile columns except the one remaining tile column. The width value of the one remaining column may also be equal to TileWidth value.

Alternatively, or additionally, a TileHeight value is decoded from one or more code words in the bitstream. Then the height values of all tile rows in the picture except one is set equal to the derived TileHeight value. The height value of the one remaining tile row is set equal to the picture height value minus the sum of the height values of all tile rows except the one remaining tile row. The height value of the one remaining row may also be equal to the TileHeight value.

Figure 12:
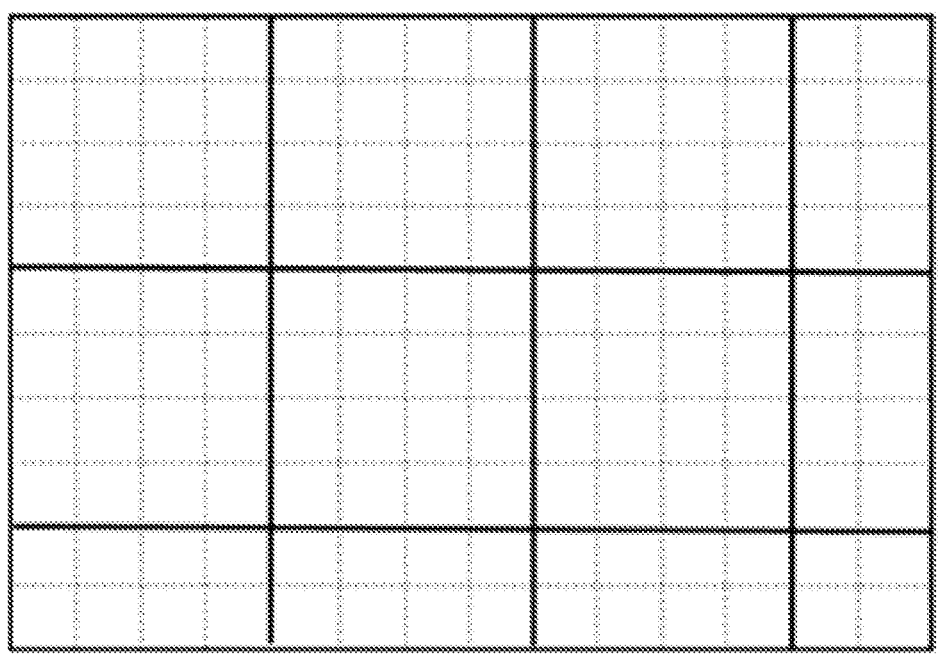
FIG. 12 shows a picture according to one embodiment.

The method in this embodiment results in most tiles being of equal size, for example, as illustrated in picture 1200 shown in FIG. 12 where most tiles are of size 4×4 CTUs or tile units.

The embodiment can be implemented in HEVC v5 or the current VVC draft by remove the following text from the HEVC v5 or the draft VVC specification.

```
if( uniform_tile_spacing_flag )
    for( i = 0; i <= num_tile_columns_minus1; i++ )
        ColWidth[ i ] = ( ( i + 1 ) * PicWidthInCtbsY ) / (
num_tile_columns_minus1 + 1 ) –
                                                         ( i *
PicWidthInCtbsY ) / ( num_tile_columns_minus1 + 1 )
if( uniform_tile_spacing_flag )
    for( j = 0; j <= num_tile_rows_minus1; j++ )
        RowHeight[ j ] = ( ( j + 1 ) * PicHeightInCtbsY ) / (
num_tile_rows_minus1 + 1 ) –
                                                         ( j *
PicHeightInCtbsY ) / ( num_tile_rows_minus1 + 1 )
```

The removed text above is replaced by the following text in the HEVC v5 or VVC draft specification respectively.

```
if( uniform_tile_spacing_flag ) {
    RemainingWidthInCtbsY = PicWidthInCtbsY
    i=0
    while( RemainingWidthInCtbsY > tile_width ) {
        ColWidth[i++] = tile_width
        RemainingWidthInCtbsY -= tile_width
    }
    ColWidth[i] = RemainingWidthInCtbsY
    num_tile_columns_minus1 = i
}
if( uniform_tile_spacing_flag ) {
    RemainingHeightInCtbsY = PicHeightInCtbsY
    i=0
    while( RemainingHeightInCtbsY > tile_height ) {
        RowHeight[i++] = tile_height
        RemainingHeightInCtbsY -= tile_height
    }
    RowHeight[i] = RemainingHeightInCtbsY
    num_tile_rows_minus1 = i
}
```

The syntax and semantics for tile_width and tile_height may look as follows:

TABLE 5

Tile syntax for the seventh embodiment

|  | Descriptor |
|---|---|
| pic_parameter_set_rbsp( ) { | |
| ... | |
| tiles_enabled_flag | u(1) |
| ... | |
| if( tiles_enabled_flag ) { | |

TABLE 5-continued

Tile syntax for the seventh embodiment

| | Descriptor |
|---|---|
| uniform_spacing_flag | u(1) |
| if( uniform_spacing_flag ) { | |
|    tile_width | ue(v) |
|    tile_height | ue(v) |
| } else { | |
|    num_tile_columns_minus1 | ue(v) |
|    num_tile_rows_minus1 | ue(v) |
|    for( i = 0; i < num_tile_columns_minus1; i++ ) | |
|       column_width_minus1[ i ] | ue(v) |
|    for( i = 0; i < num_tile_rows_minus1; i++ ) | |
|       row_height_minus1[ i ] | ue(v) |
| } | |
| loop_filter_across_tiles_enabled_flag | u(1) |
| } | |
| ... | |

Table 5. Tile syntax for the seventh embodiment

The syntax and semantics are explained in further detail below:

num_tile_columns_minus1 plus 1 specifies the number of tile columns partitioning the picture. num_tile_columns_minus1 shall be in the range of 0 to PicWidthInCtbsY−1, inclusive. When tiles_enabled_flag is equal to 0, the value of num_tile_columns_minus1 is inferred to be equal to 0. Otherwise, if uniform_spacing_flag is equal to 1, the value of num_tile_columns_minus1 is derived as shown above.

num_tile_rows_minus1 plus 1 specifies the number of tile rows partitioning the picture. num_tile_rows_minus1 shall be in the range of 0 to PicHeightInCtbsY−1, inclusive. When tiles_enabled_flag is equal to 0, the value of num_tile_rows_minus1 is inferred to be equal to 0. Otherwise, if uniform_spacing_flag is equal to 1, the value of num_tile_rows_minus1 is derived as shown above.

When tiles_enabled_flag is equal to 1, num_tile_columns_ minus1 and num_tile_rows_minus1 shall not be both equal to 0.

tile_width specifies the width of all tiles not belonging to the last tile column. tile_width shall be in the range of 1 to PicWidthInCtbsY−1, inclusive.

tile_height specifies the height of all tiles not belonging to the last tile row. tile_height shall be in the range of 1 to PicHeightInCtbsY−1, inclusive.

A decoder may perform all or a subset of the following steps for this embodiment:

1. Decode information that one or more pictures are partitioned into more than one segment from one or more syntax elements in the bitstream. The syntax is preferably located in a picture parameter set.

2. Decode information that the spatial segmentation is uniform from one or more syntax elements in the bitstream. The syntax is preferably located in a picture parameter set. The syntax may consist of a one-bit flag specifying whether the spatial segmentation is uniform or not.

3. Determine a segment unit size S either from one or more syntax elements or by using a predefined segment unit size. If a predefined unit size is used, it may be equal to the coding tree unit. For instance, if the CTU size is equal to 128×128, the segment unit size S may be equal to 128 (or 128×128).

4. Calculate the size of the picture in number of segment units. The calculation may be done separate for the height and width such that the horizontal size HS is set equal to the picture width in luma samples divided by the segment unit size. The vertical size VS may be set equal to the picture height in luma samples divided by the segment unit size.

5. Decode a value TileWidth representative of a tile width in S units from a code word in the bitstream. The code word may be a UVLC code word. The code word may be decoded as the tile width minus one and the value TileWidth may therefore be set equal to the decoded value plus 1.

6. Decode a value TileHeight representative of a tile height in S units from a code word in the bitstream. The code word may be a UVLC code word. The code word may be decoded as the tile height minus one and the value TileWidth may therefore be set equal to the decoded value plus 1.

7. Derive the segment column widths from the picture width in number of tile units and the TileWidth variable by the following substeps:
  a. Set the picture width yet to be segmented (A) equal to the value HS
  b. Set a variable i equal to the value 0
  c. Repeatedly execute the following substeps as long as the picture width yet to be segmented (A) is larger than the value TileWidth:
    i. Set the column width of the i-th segment column to TileWidth
    ii. Subtract the value TileWidth from the value A
    iii. Increase the value of the variable i by 1
  d. Set the column width of the i-th segment column to the value A
  e. Set a variable num_tile_columns_minus1 equal to the value of variable i, or alternatively, set a variable representing the number of tile columns in the picture equal to the value of the variable i plus 1

8. Derive the segment row heights from the picture height in number of tile units and the TileHeight variable by the following substeps:
  a. Set the picture height yet to be segmented (A) equal to the value VS
  b. Set a variable i equal to the value 0
  c. Repeatedly execute the following substeps as long as the picture height yet to be segmented (A) is larger than the value TileHeight:
    i. Set the row height of the i-th segment row to TileHeight
    ii. Subtract the value TileHeight from the value A
    iii. Increase the value of the variable i by 1
  d. Set the row height of the i-th segment row to the value A
  e. Set a variable num_tile_rows_minus1 equal to the value of variable i, or alternatively, set a variable representing the number of tile rows in the picture equal to the value of the variable i plus 1

9. Derive the spatial location for a current block using derived segment widths and derived segment heights.

10. Decode the current block using the derived spatial location. Store the decoded sample values for the current block in memory at memory positions corresponding to the derived spatial location.

Embodiment 6

In the sixth embodiment, one of multiple methods for uniform tile partitioning may be used. In one embodiment, there are one or more syntax elements indicating which one of the multiple methods to use. The one or more syntax elements may be a flag specifying which of two methods that is used. The one or more syntax elements may be present in a parameter set such as a picture parameter set but this embodiment is not constrained to only that location. The set of multiple methods may include any method disclosed herein as well as methods known in the art such as the methods described in the HEVC v5 specification and the draft VVC specification.

Embodiment 7. Small Ones to the Left or Top

In embodiments 5-6 described above in the current disclosure, the tiles have been ordered such that the full-size tiles are located to the left and top in the tile structure of the picture.

Figure 13:
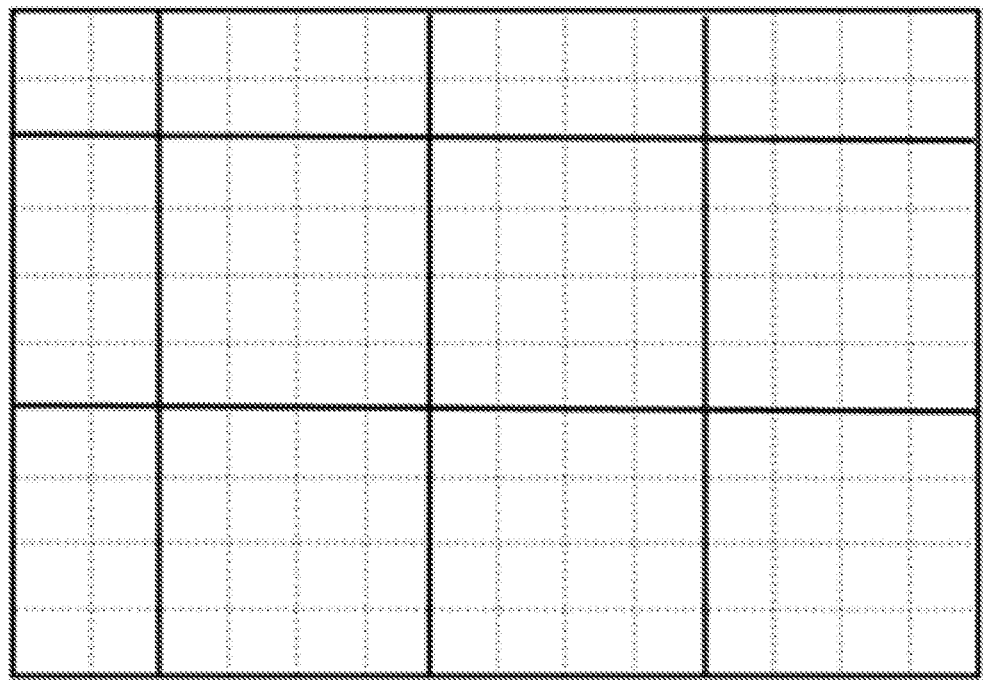
FIG. 13 shows a uniform tile structure according to one embodiment.

In the seventh embodiment, the tiles are ordered in the opposite way as in embodiments 5-6, i.e. the tile width remainder is the width of the leftmost tile(s) in the uniform tile structure and/or the tile height remainder is the height of the topmost tile(s) in the uniform tile structure. With other words the full-size tiles are located to the right and/or the bottom and the smaller sized tiles with the width equal to the tile width remainder and/or with the height equal to the tile height are located to the left and/or to the top in the tile structure. This is exemplified in FIG. 13 with a picture 1300 that is 896×640 pixels. Solid lines represent tile borders and dashed lines represent CTU borders. Each CTU is 64×64 pixels. FIG. 13 shows an example of uniform tile structure with full size tiles to the bottom and right and the smaller tiles located to the left and to the top.

Embodiment 8. Alignment with the Tile Group Boundaries

In the eighth embodiment, the sizes of the tiles are ordered according to any of the previous embodiments with the addition that the tiles are grouped in tile groups where each tile group may contain a row/column of tiles with the tile width/height equal to a tile height/with remainder.

Figure 14:
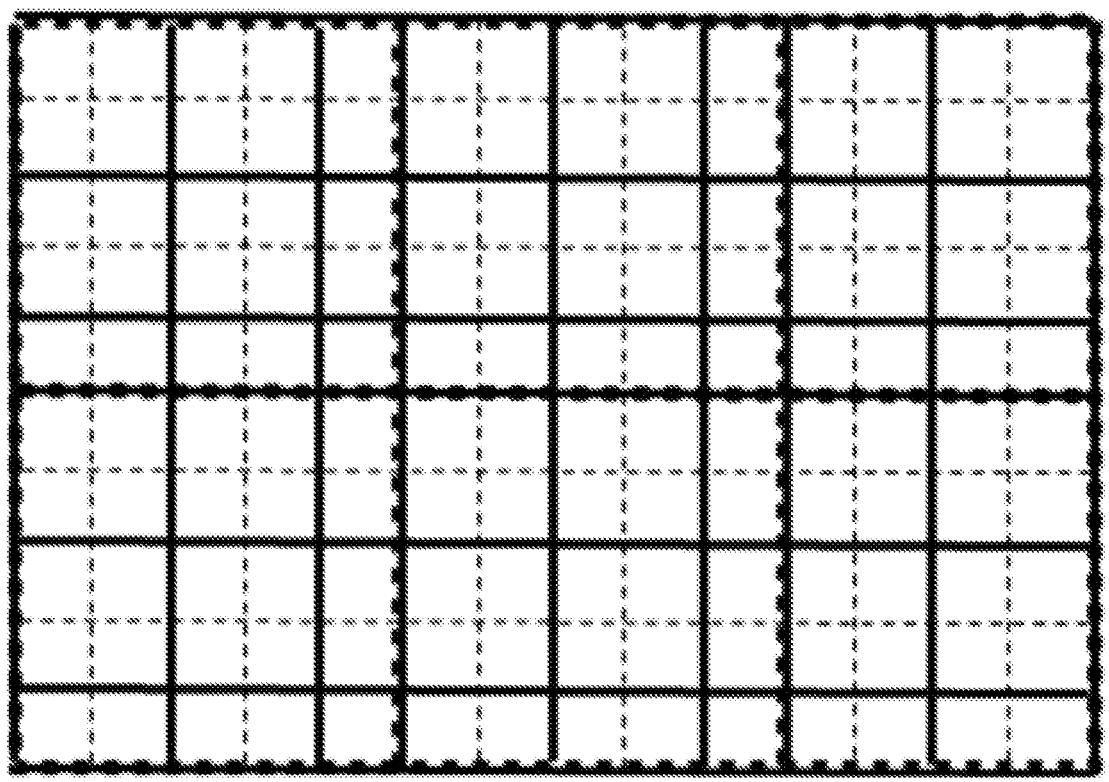
FIG. 14 shows a tile structure according to one embodiment.

This is illustrated in FIG. 14 where a tile group is represented with large dotted lines, tiles are represented with solid lines and CTUs are represented with dashed lines. Note that not all tile groups may have tiles with equal tile width remainder depending on if the total remainder is equally divisible by the number of CTUs. FIG. 14 shows an example of tile structure with tile groups where each tile group may contain a tile with width and/or height equal to the a tile width/height remainder value.

In the example shown in FIG. 14, the tile group width is 5 CTUs and the tile width is 2 CTUs. Since the width of the picture is 14 CTUs the picture is divided into 3 tile groups in horizontal direction, with 5, 5, and 4 tiles respectively. The two first tile groups are divided horizontally into two full size tiles of 2 CTUs and one tile with the remainder tile width of 1 CTU. The leftmost tile group is equally divisible by 2 CTUs so no tile with remainder tile width is needed. There may also be a scenario with larger tiles containing more CTUs (e.g. 4 tiles horizontally) where the remainders would be 3, 3, 2, i.e. all tile groups have tiles with tile width remainder, but the tile width remainder is not the same for all tile groups.

Figure 15:
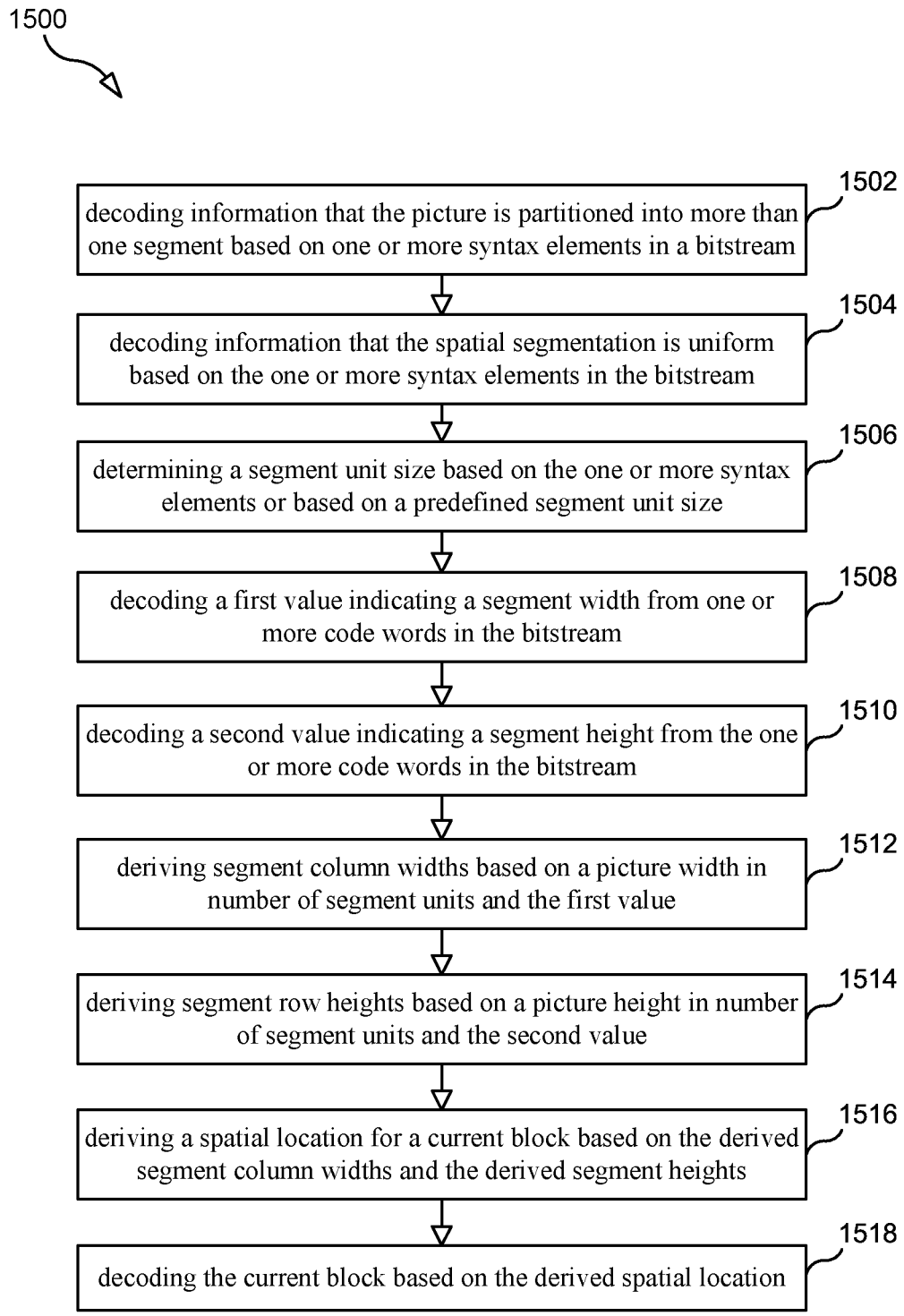
FIG. 15 is a flow chart illustrating a process according to an embodiment.

FIG. 15 is flow chart illustrating a process 1500 according to an embodiment. Process 1500 is a method for decoding a picture. The 1500 method includes decoding information that the picture is partitioned into more than one segment based on one or more syntax elements in a bitstream (step 1502); decoding information that the spatial segmentation is uniform based on the one or more syntax elements in the bitstream (step 1504); determining a segment unit size based on the one or more syntax elements or based on a predefined segment unit size (step 1506); decoding a first value indicating a segment width from one or more code words in the bitstream (step 1508); decoding a second value indicating a segment height from the one or more code words in the bitstream (step 1510); deriving segment column widths based on a picture width in number of segment units and the first value (step 1512); deriving segment row heights based on a picture height in number of segment units and the second value (step 1514); deriving a spatial location for a current block based on the derived segment column widths and the derived segment heights (step 1516); and decoding the current block based on the derived spatial location (step 1518).

In some embodiments, deriving segment column widths comprises setting column width values of all segment columns in the picture except one column equal to the first value, and setting the column width value of the one remaining segment column equal to a picture width minus the sum of the width values of all segment columns except the one segment column.

In some embodiments, deriving segment row heights comprises setting row height values of all segment rows in the picture except one row equal to the second value, and setting the row height value of the one remaining segment row equal to a picture height minus the sum of the height values of all segment rows except the one segment row.

In some embodiments, the one or more syntax elements is located in a picture parameter set.

In some embodiments, the one or more syntax element comprises a one-bit flag specifying whether the spatial segmentation is uniform.

In some embodiments, the predetermined segment unit size is equal to a coding tree unit In some embodiments, calculating the size of the picture in segment comprises: calculating the size of the picture segment for the height and calculating the size of the picture segment for the width.

In some embodiments, the first value is a TileWidth value representative of a tile width in segment units, and the second value is a TileHeight representative of a tile height in segment units.

Figure 16:
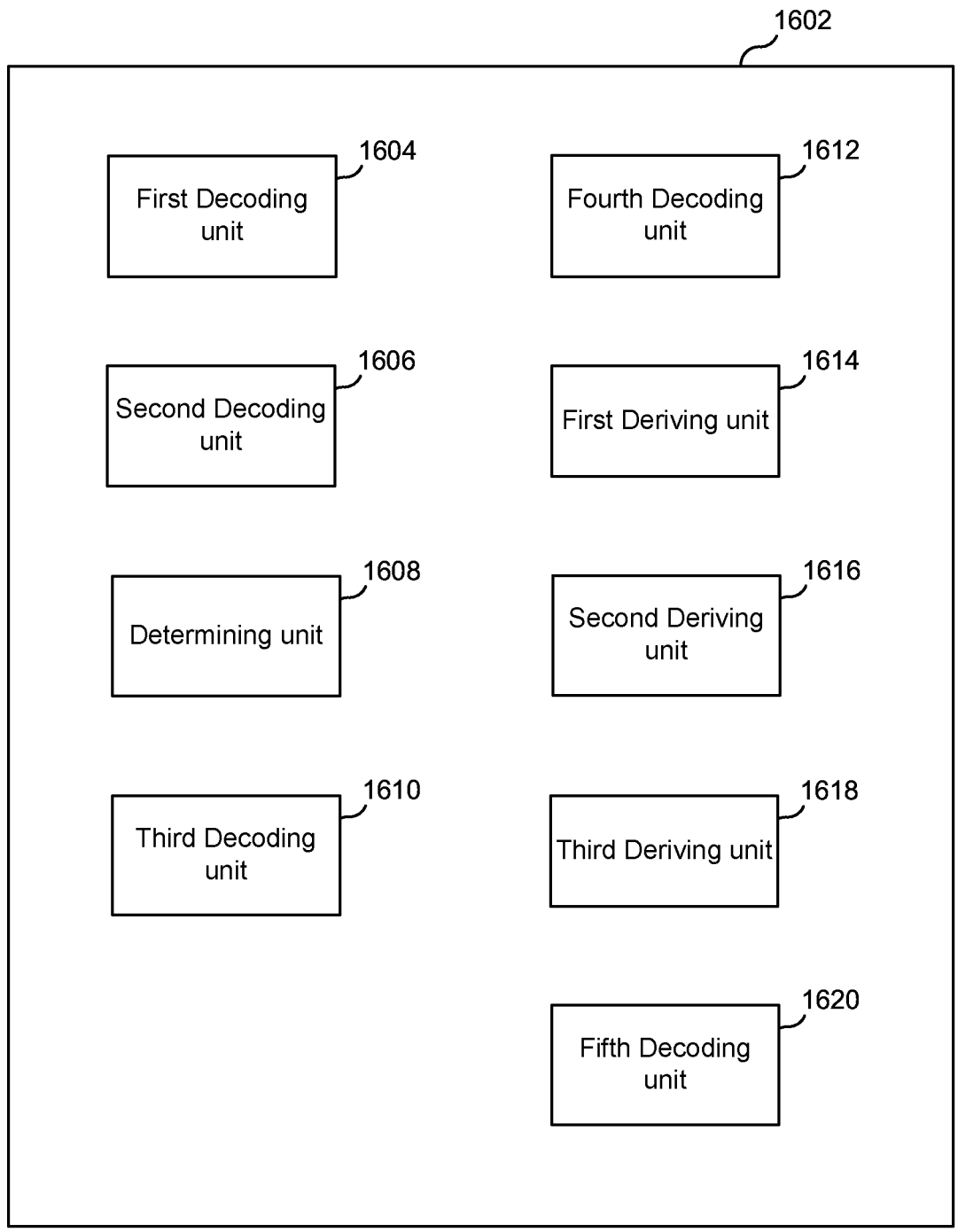
FIG. 16 is a diagram showing functional units of a decoder according to one embodiment.

FIG. 16 is a diagram showing functional units of a decoder 1602 according to some embodiments. As shown in FIG. 16, decoder 1602 includes a first decoding unit 1604 for decoding information that the picture is partitioned into more than one segment based on one or more syntax elements in a bitstream; a second decoding unit 1606 for decoding information that the spatial segmentation is uniform based on the one or more syntax elements in the bitstream; a determining unit 1608 for determining a segment unit size based on the one or more syntax elements or based on a predefined segment unit size; a third decoding unit 1610 for decoding a first value indicating a segment width from one or more code words in the bitstream; a fourth decoding unit 1612 for decoding a second value indicating a segment height from the one or more code words in the bitstream; a first deriving unit 1614 for deriving segment column widths based on a picture width in number of segment units and the first value; a second deriving unit 1616 for deriving segment row heights based on a picture height in number of segment units and the second value; a third deriving unit 1618 for deriving a spatial location for a current block based on the derived segment column widths and the derived segment heights; and a fifth decoding unit 1620 for decoding the current block based on the derived spatial location.

Figure 7:
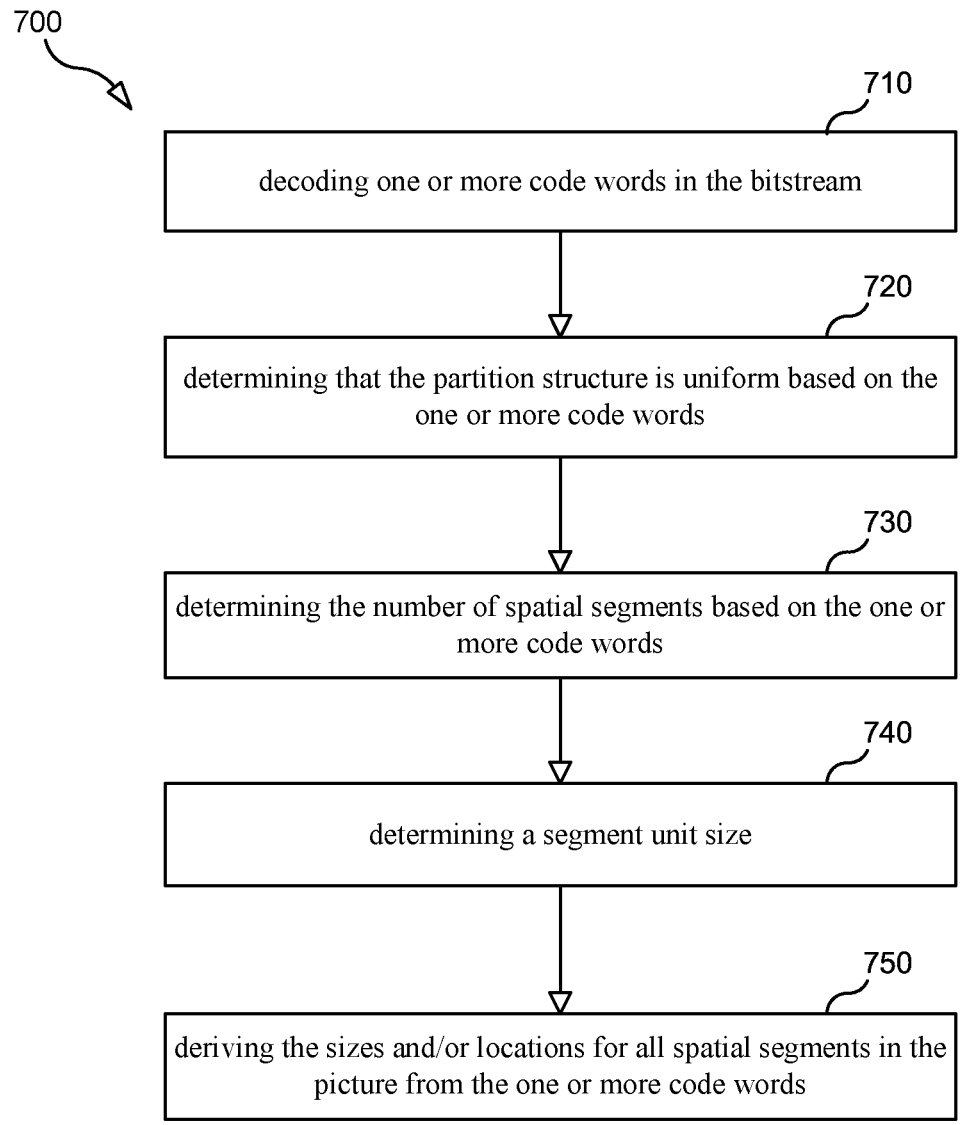
FIG. 7 is a flow chart illustrating a process according to an embodiment.

FIG. 7 is a flow chart illustrating a process 700 according to an embodiment. Process 700 is a method for decoding a picture (10) comprising a number of units (8) from a bitstream, the picture being partitioned into at least two spatial segments (11) by a partition structure (13). The method includes decoding one or more code words in the bitstream (step 710); determining that the partition structure is uniform based on the one or more code words (step 720); determining the number of spatial segments based on the one or more code words (step 730); determining a segment unit size (step 740); and deriving the sizes and/or locations for all spatial segments in the picture from the one or more code words (step 750), wherein the derivation of the segment sizes and/or location comprises a first loop over the number of spatial segments in a first dimension or direction, and the number of remaining segment units in the first dimension or direction to be segmented and the number of remaining segments in the first dimension are calculated inside the first loop.

In some embodiments, the derivation of the segment sizes and/or location comprises a second loop over the number of spatial segments in a second dimension or direction other than the first dimension or direction, and the number of remaining segment units in the second dimension or direction to be segmented and the number of remaining segments in the second dimension or direction are calculated inside the second loop.

In some embodiments, the first dimension or direction is a horizontal dimension or direction and the second dimension or direction is a vertical dimension or direction.

In some embodiments, the width of the segments in a row or the height of the segments in a column follows a specified order.

In some embodiments, the width of the segments in a row or the height of the segments in a column are in a never ascending or a never descending order.

In some embodiments, a binary segment split with an explicit ordering of the segment width or height is applied to the width or height of the picture.

In some embodiments, the width of the segments in a row or the height of the segments in a column of a picture follows a specified default order for the width or height of the segments.

In some embodiments, the segment unit size is equal to the size of the coding tree unit (CTU).

In some embodiments, the segment unit size is smaller than the size of the coding tree unit (CTU). In some embodiments, the segment unit size is larger than the size of the CTU. In some embodiments, any segment is a tile.

In some embodiments, deriving the sizes comprises:
deriving a list Sizes[ ] as:
A=PicWidthInTileUnits
B=NumberOfSegmentColumns
for(i=0; i<NumberOfSegmentColumns; i++) {
　Sizes[i]=Round(A÷B)
　A=A−Sizes[i]
　B=B−1
}
where NumberOfSegmentColumns is the number of segment columns, PicWidthInTileUnits is the width of the picture in tile units, Round( ) is either the Floor( ) function or the Ceil( ) function, and ÷ is division without truncation or rounding.

In some embodiments, deriving the sizes comprises:
deriving a list Sizes[ ] as:
A=PicHeightInTileUnits
B=NumberOfSegmentRows
for(i=0; i<NumberOfSegmentRows; i++) {
　Sizes[i]=Round(A÷B)
　A=A−Sizes[i]
　B=B−1
}
where NumberOfSegmentRows is the number of segment rows, PicHeightInTileUnits is the height of the picture in tile units, Round( ) is either the Floor( ) function or the Ceil( ) function, and ÷ is division without truncation or rounding.

In some embodiments, the segments (11) are independent with respect to other segments (11) such that the derivation of any intra prediction mode for any unit (16) in a current segment (15) depends only on previously derived intra prediction modes in units (17) that belong to the current segment (15) and does not depend on any intra prediction mode in any unit (18) that belongs to a different segment (14).

In some embodiments, the method includes a further step of partitioning the segments to uniform widths or heights follows a fixed ripple pattern independent from the number of the spatial segments.

Figure 8:
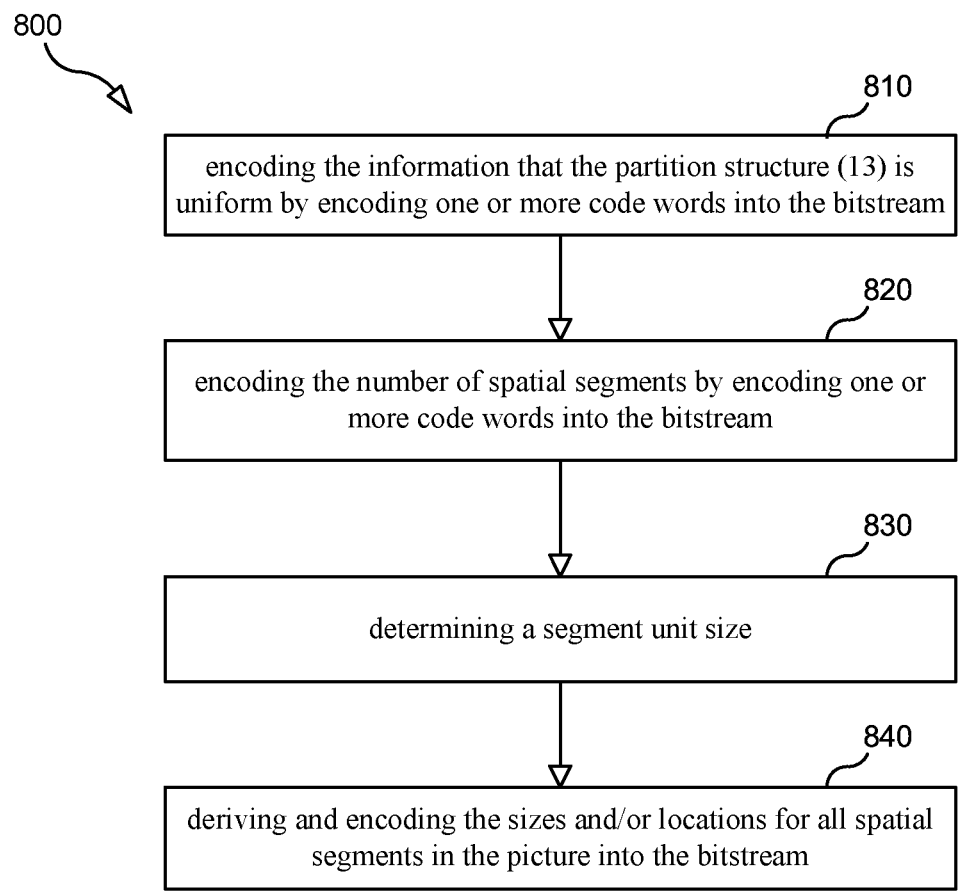
FIG. 8 is a flow chart illustrating a process according to an embodiment.

FIG. 8 is a flow chart illustrating a process 800 according to an embodiment. Process 800 is a method for encoding a picture (10) comprising a number of units (8) into a bitstream, the picture being partitioned into at least two spatial segments (11) by a uniform partition structure (13). The method includes encoding the information that the partition structure (13) is uniform by encoding one or more code words into the bitstream (step 810); encoding the number of spatial segments by encoding one or more code words into the bitstream (step 820); determining a segment unit size (step 830); and deriving and encoding the sizes and/or locations for all spatial segments in the picture into the bitstream (step 840), wherein the derivation of the segment sizes comprises a first loop over the number of spatial segments in a first dimension or direction, and the number of remaining segment units in the first dimension or direction to be segmented and the number of remaining segments in the first dimension or direction are calculated inside the first loop.

In some embodiments, the derivation of the segment sizes and/or location comprises a second loop over the number of spatial segments in a second dimension or direction other than the first dimension or direction, and the number of remaining segment units in the second dimension or direction to be segmented and the number of remaining segments in the second dimension or direction are calculated inside the second loop.

In some embodiments, the first dimension or direction is a horizontal dimension or direction and the second dimension or direction is a vertical dimension or direction.

Figure 9:
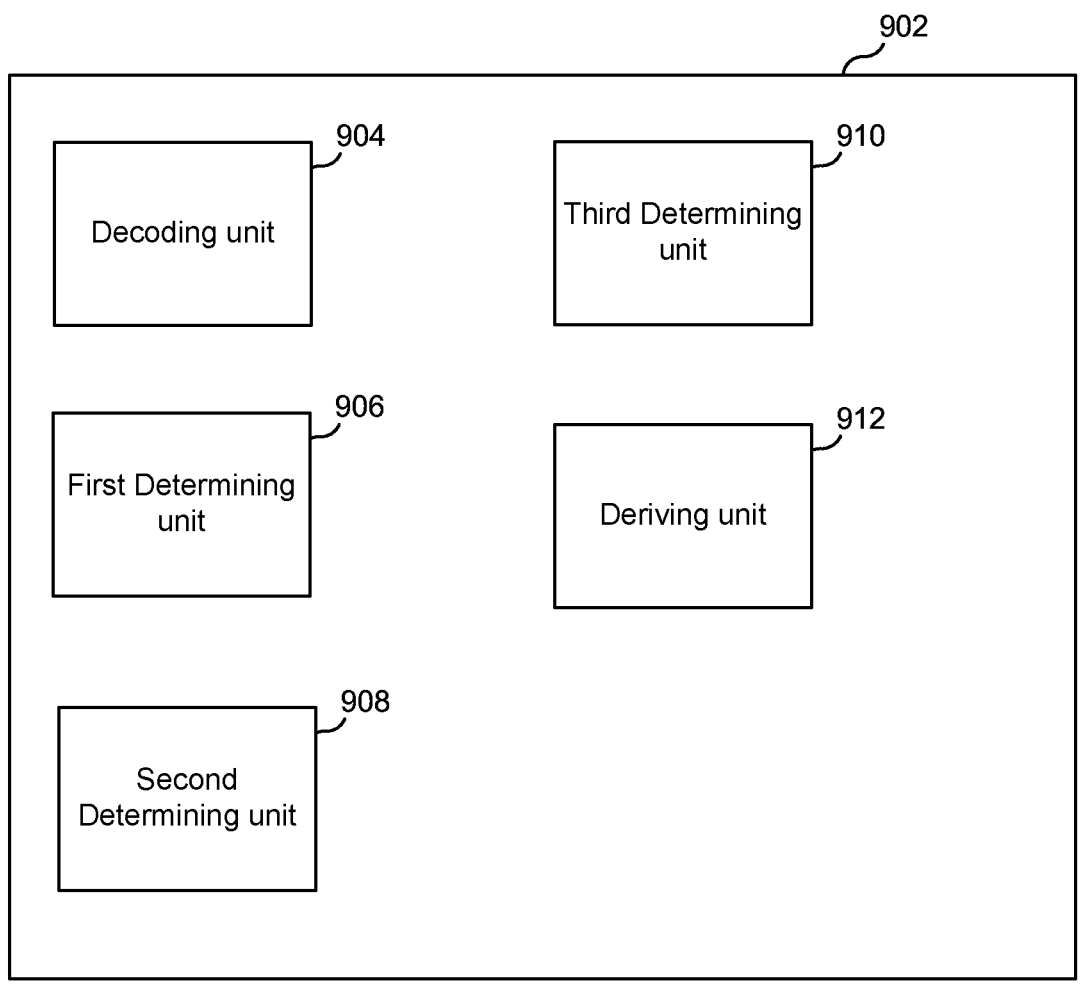
FIG. 9 is a diagram showing functional units of a decoder according to one embodiment.

FIG. 9 is a diagram showing functional units of a decoder 902 according to some embodiments. As shown in FIG. 9, decoder 902 includes a decoding unit 904 for decoding one or more code words in the bitstream; a first determining unit 906 for determining that the partition structure is uniform based on the one or more code words; a second determining unit 908 for determining the number of spatial segments based on the one or more code words; a third determining unit 910 for determining a segment unit size; and a deriving unit 912 for deriving the sizes and/or locations for all spatial segments in the picture from the one or more code words, wherein the derivation of the segment sizes and/or location comprises a first loop over the number of spatial segments in a first dimension and a second loop over the number of spatial segments in a second dimension, the number of remaining segment units in the first dimension to be segmented and the number of remaining segments in the first dimension are calculated inside the first loop, and the number of remaining segment units in the second dimension to be segmented and the number of remaining segments in the second dimension are calculated inside the second loop.

Figure 10:
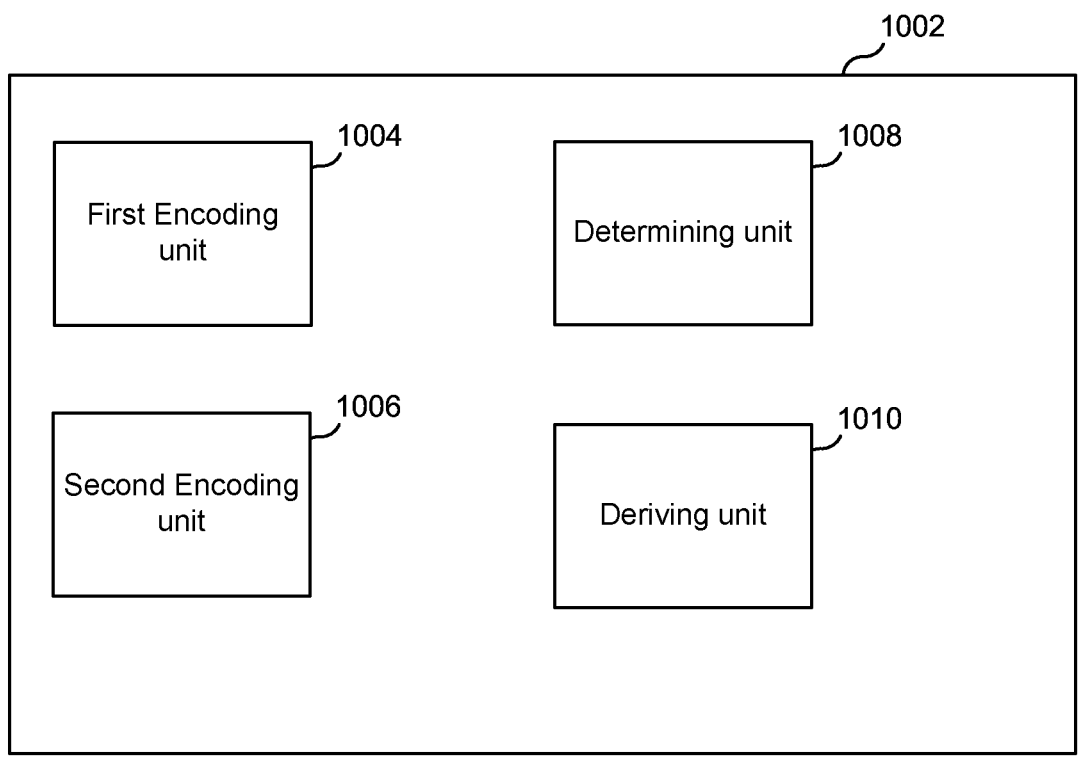
FIG. 10 is a diagram showing functional units of an encoder according to one embodiment.

FIG. 10 is a diagram showing functional units of an encoder 1002 according to some embodiments. As shown in FIG. 10, encoder 1002 includes a first encoding unit 1004 for encoding the information that the partition structure (13) is uniform by encoding one or more code words into the bitstream; a second encoding unit 1006 for encoding the number of spatial segments by encoding one or more code words into the bitstream; a determining unit 1008 for determining a segment unit size; and a deriving unit 1010 for deriving and encoding the sizes and/or locations for all spatial segments in the picture into the bitstream, wherein the derivation of the segment sizes comprises a first loop over the number of spatial segments in a first dimension and a second loop over the number of spatial segments in a second dimension, the number of remaining segment units in the first dimension to be segmented and the number of remaining segments in the first dimension are calculated inside the first loop, and the number of remaining segment units in the second dimension to be segmented and the number of remaining segments in the second dimension are calculated inside the second loop.

In some embodiments, the encoder is configured to define a partition structure that divides a picture into a number of uniform spatial segments, wherein each spatial segment comprises at least one unit, and wherein derivation of the segment sizes is performed in a first loop over the number of spatial segments in a first dimension and a second loop over the number of spatial segments in a second dimension, wherein the number of remaining segment units in the first dimension to be segmented and the number of remaining segments in the first dimension are calculated inside the first loop, and wherein the number of remaining segment units in the second dimension to be segmented and the number of remaining segments in the second dimension are calculated inside the second loop; encode the plurality of spatial segments in accordance with the partition structure to generate a plurality of coded spatial segments, wherein each coded spatial segment corresponds to one of the spatial segments of the partition structure, and each coded spatial segment is independent such that derivation of any intra prediction mode for a first unit of the first spatial segment depends on a derived intra prediction mode for a second unit of the first spatial segment and is independent of any intra prediction mode for units of other spatial segments of the partition structure; and generate a bit stream comprising the plurality of coded spatial segments and information indicating the uniform partition structure used to divide the picture into the plurality of spatial segments.

Figure 11:
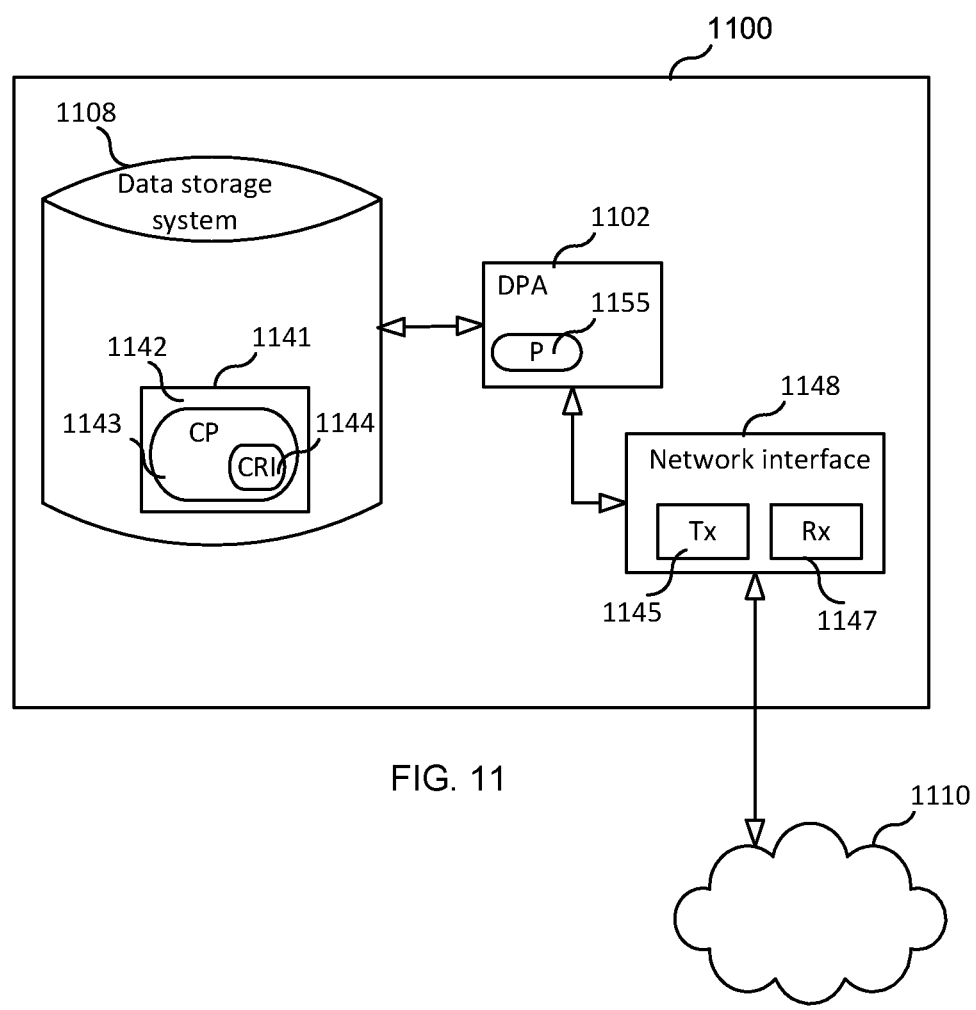
FIG. 11 is a block diagram of a node according to some embodiments.

FIG. 11 is a block diagram of an apparatus 1100 for implementing decoder 902, 1602 and/or encoder 1002, according to some embodiments. When apparatus 1100 implements a decoder, apparatus 1100 may be referred to as a "decoding apparatus 1100," and when apparatus 1100 implements an encoder, apparatus 1100 may be referred to as an "encoding apparatus 1100." As shown in FIG. 11, apparatus 1100 (a.k.a., "node") may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling the apparatus 1100 to transmit data to and receive data from other nodes connected to a network 1110 (e.g., an Internet Protocol (IP) network) to which network interface 1148 is connected; and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes the apparatus 1100 to perform steps described herein (e.g., steps described herein with reference to the flow charts). In other embodiments, the apparatus 1100 may be configured to perform steps described herein without the need for code. That is, for example, PC 1102 may consist merely of one or more ASICs. Hence, the features of the embodiments described herein may be implemented in hardware and/or software.

Summary of Various Embodiments

A1. A method for decoding a picture, the method comprising: decoding information that the picture is partitioned into more than one segment based on one or more syntax elements in a bitstream; decoding information that the spatial segmentation is uniform based on the one or more syntax elements in the bitstream; determining a segment unit size based on the one or more syntax elements or based on a predefined segment unit size; decoding a first value indicating a segment width from one or more code words in the bitstream; decoding a second value indicating a segment height from the one or more code words in the bitstream; deriving segment column widths based on a picture width in number of segment units and the first value; deriving segment row heights based on a picture height in number of segment units and the second value; deriving a spatial location for a current block based on the derived segment column widths and the derived segment row heights; and decoding the current block based on the derived spatial location.

A2. The method of embodiment A1, wherein deriving segment column widths comprises: setting column width values of all segment columns in the picture except one column equal to the first value, and setting the column width value of the one remaining segment column equal to a picture width minus the sum of the width values of all segment columns except the one segment column.

A3. The method of embodiment A1 or A2, wherein deriving segment row heights comprises: setting row height values of all segment rows in the picture except one row equal to the second value, and setting the row height value of the one remaining segment row equal to a picture height minus the sum of the height values of all segment rows except the one segment row.

A4. The method of any one of embodiments A1-A3, wherein the one or more syntax elements is located in a picture parameter set.

A5. The method of any one of embodiments A1-A4, wherein the one or more syntax elements comprises a one-bit flag specifying whether the spatial segmentation is uniform.

A6. The method of any one of embodiments A1-A5, wherein a segment unit is a coding tree unit or a coding tree block.

A7. The method of any one of claims A1-A6, further comprising calculating the size of the picture in number of segment units.

A8. The method claim A7, wherein calculating the size of the picture in number of segment units comprises: calculating the size of the picture segment for the height and calculating the size of the picture segment for the width.

A9. The method of any one of claims A1-A8, wherein the first value represents a tile width in segment units, and the second value represents a tile height in segment units.

A10. The method of any one of claims A1-A9, wherein decoding the first value from one or more code words in the bitstream consists of decoding a value of a particular code word in the bitstream and adding 1 to the decoded value.

A11. The method of any one of claims A1-A10, wherein deriving segment column widths comprises:
setting a variable, A, to a remaining width value; and
determining whether a value equal to (A−TileWidth) is less than TileWidth, wherein TileWidth is equal to the first value.

A12. The method of claim A11, wherein if it is determined that the value of (A −TileWidth) is not less than the first value, then performing the steps of:
setting a first column width variable equal to TileWidth; and
determining whether a value equal to (A−(2×TileWidth)) is less than TileWidth.

A13. The method of claim A11 or A12, wherein determining whether the value (A−TileWidth) is less than TileWidth comprises:
setting A equal to (A−TileWidth); and
comparing A with TileWidth.

A14. The method of claim A12 or A13, wherein if it is determined that A −TileWidth is less than TileWidth, then setting a second column width variable equal to A −TileWidth.

A15. The method of claim A15, wherein setting the second column width variable equal to A−TileWidth is only performed if A−TileWidth is greater than 0.

A16. The method of claim A14 or A15, further comprising setting a variable representing a number of tile columns in the picture equal to the value of a variable i or equal to the value of the variable i plus 1, wherein i is an integer such that the value (A−((i−1)×TileWidth)) is not less than TileWidth but the value (A−(i×TileWidth)) is less than TileWidth.

A17. The method of any one of claims A1-A10, wherein deriving segment column widths comprises:
1) setting a variable, A, to a remaining width value; and
2) setting a variable, i, to an initial value;
3) determining whether a value equal to (A−(i×TileWidth)) is less than TileWidth, wherein TileWidth is equal to the first value; and
4) if it is determined that the value equal to (A−(i×TileWidth)) is not less than TileWidth, then performing the steps of: setting a variable col_width[i] equal to TileWidth, incrementing i, and repeating steps 3) and 4).

A18. The method of claim A17, wherein after it is determined that the value equal to (A−(i×TileWidth)) is less than TileWidth, then performing setting col_width[i] equal to A and incrementing i.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a picture, the method comprising:
decoding information that the picture is partitioned into more than one segment based on one or more syntax elements in a bitstream;
decoding information that a spatial segmentation is uniform based on the one or more syntax elements in the bitstream;
determining a segment unit size based on the one or more syntax elements or based on a predefined segment unit size;
decoding a tile width value (TW) indicating a segment width from one or more code words in the bitstream;
decoding a tile height value (TH) indicating a segment height from one or more code words in the bitstream;
determining a picture width value (PW) for the picture;
determining a picture height value (PH) for the picture;
deriving segment column widths based on the picture width value and the tile width value, wherein deriving the segment column widths comprises setting column width values of all segment columns in the picture except one remaining segment column equal to the tile width value and setting the column width value of the one remaining segment column equal to the picture width value minus the sum of the width values of all segment columns except the one remaining segment column;
deriving segment row heights based on the picture height value and the tile height value;
deriving a spatial location for a current block based on the derived segment column widths and the derived segment row heights; and
decoding the current block based on the derived spatial location, wherein
the step of setting the column width values of all segment columns in the picture except the one remaining segment column equal to the tile width value comprises:
obtaining a first remaining width value (RW), where RW value is less than or equal to X, where X is equal to PW−TW;
determining whether RW is not less than TW; and
as a result of determining that RW is not less than TW, setting the value of a column width variable equal to TW.

2. The method of claim 1, wherein the one or more syntax elements is located in a picture parameter set.

3. The method of claim 1, wherein the one or more syntax elements comprises a one-bit flag specifying whether the spatial segmentation is uniform.

4. The method of claim 1, wherein a segment unit is a coding tree unit or a coding tree block.

5. The method of claim 1, further comprising calculating the size of the picture in number of segment units.

6. The method of claim 5, wherein calculating the size of the picture in number of segment units comprises: calculating the size of the picture segment for the height and calculating the size of the picture segment for the width.

7. The method of claim 1, wherein the tile width value represents a tile width in segment units, and the tile height value represents a tile height in segment units.

8. The method of claim 1, wherein
decoding the tile width value from one or more code words in the bitstream consists of decoding a value of a particular code word in the bitstream and adding 1 to the decoded value, and/or
decoding the tile height value from one or more code words in the bitstream consists of decoding a value of a second particular code word in the bitstream and adding 1 to the decoded value.

9. A method for decoding a picture, the method comprising:
decoding information that the picture is partitioned into more than one segment based on one or more syntax elements in a bitstream;
decoding information that a spatial segmentation is uniform based on the one or more syntax elements in the bitstream;
determining a segment unit size based on the one or more syntax elements or based on a predefined segment unit size;
decoding a first value indicating a segment width from one or more code words in the bitstream;
decoding a second value indicating a segment height from one or more code words in the bitstream;
deriving segment column widths based on a picture width in number of segment units and the first value, wherein deriving segment column widths comprises setting column width values of all segment columns in the picture except one column equal to the first value, and setting the column width value of the one remaining segment column equal to the picture width minus the sum of the width values of all segment columns except the one segment column;
deriving segment row heights based on a picture height in number of segment units and the second value;
deriving a spatial location for a current block based on the derived segment column widths and the derived segment row heights; and
decoding the current block based on the derived spatial location, wherein
deriving segment column widths comprises: comparing a value equal to (A−TW) to TW, wherein A is equal to a remaining width value, and/or
deriving segment row heights comprises: comparing a value equal to (A−TH) to TH, wherein A is equal to a remaining height value.

10. The method of claim 9, wherein
the remaining width value is equal to said picture width, and/or
the remaining height value is equal to said picture height.

11. The method of claim 9, wherein
if it is determined that the value of (A−TW) is greater than TW, then performing the steps of: setting a first column width variable equal to TW; and comparing a value equal to (A−(2×TW)) to TW, and/or
if it is determined that the value of (A−TH) is greater than TH, then performing the steps of: setting a first row height variable equal to TH; and comparing a value equal to (A−(2×TH)) to TH.

12. The method of claim 9, wherein
comparing the value (A−TW) to TW comprises: setting A equal to (A−TW); and comparing A with TW, and/or
comparing the value (A−TH) to TH comprises: setting A equal to (A−TH); and comparing A with TH.

13. A computer program product comprising a non-transitory computer readable medium storing a computer program comprising instructions which when executed by processing circuitry causes the processing circuitry to perform the method of claim 1.

14. A decoding apparatus for decoding a picture, the decoding apparatus being configured to perform the method of claim 1.

15. A decoding apparatus for decoding a picture, the decoding apparatus comprising:
a computer readable storage medium; and
processing circuitry coupled to the computer readable storage medium, wherein the processing circuitry is configured to cause the decoding apparatus to perform the method of claim 1.

16. A decoding apparatus for decoding a picture, the decoding apparatus comprising:
a computer readable storage medium; and
processing circuitry coupled to the computer readable storage medium, wherein the processing circuitry is configured to cause the decoding apparatus to:
determine a picture width value (PW) for the picture;
determine tile width value (TW) based on one or more code words from a bitstream;
obtain a remaining width value (RW), where RW value is less than or equal to X, where X is equal to PW−TW;
determine whether RW is not less than TW; and
as a result of determining that RW is not less than TW, set the value of a column width variable equal to TW.

17. The decoding apparatus of claim 16, wherein the decoding apparatus is further configured to:
as a result of determining that RW is not less than TW, obtaining a second remaining width value (RW2).

18. The decoding apparatus of claim 17, wherein
RW2=RW−TW, and
the decoding apparatus is further configured to set the value of another column width variable equal to RW2.

* * * * *

UNITED STATES PATENT AND TRADEMARK OFFICE
CERTIFICATE OF CORRECTION

PATENT NO. : 11,570,435 B2
APPLICATION NO. : 17/050691
DATED : January 31, 2023
INVENTOR(S) : Damghanian et al.

It is certified that error appears in the above-identified patent and that said Letters Patent is hereby corrected as shown below:

In the Specification

In Column 6, Lines 13-14, delete "PicWidthlnTileUnitsY and PicHeightlnTileUnitsY" and insert -- PicWidthInTileUnitsY and PicHeightInTileUnitsY --, therefor.

In Column 6, Lines 35-36, delete "PicHeightlnTileUnitsY-1," and insert -- PicHeightInTileUnitsY-1, --, therefor.

In Column 6, Line 49, delete "posR posL)" and insert -- posR - posL) --, therefor.

In Column 7, Line 5, delete "=rowHeight[j]" and insert -- -=rowHeight[j] --, therefor.

In Column 13, Line 5, delete "operator "+"" and insert -- operator "÷" --, therefor.

In Column 14, Line 49, below
" $\overline{( j * PicHeightInCtbsY ) / ( num\_tile\_rows\_minus1 + 1 )}$ " insert -- are replaced with the following functions: --, therefor.

In Column 16, Line 4, delete "Ceil(function" and insert -- Ceil() function --, therefor.

In Column 16, Line 42, delete "num tile rows minus 1" and insert -- num_tile_rows_minus1 --, therefor.

In Column 19, Line 17, delete "Ceil(may" and insert -- Ceil() may --, therefor.

In Column 29, Line 29, delete "(A -TileWidth)" and insert -- (A-TileWidth) --, therefor.

Signed and Sealed this
Tenth Day of October, 2023

Katherine Kelly Vidal
*Director of the United States Patent and Trademark Office*

In Column 29, Line 41, delete "A -TileWidth" and insert -- A-TileWidth --, therefor.

In Column 29, Lines 42-43, delete "A -TileWidth" and insert -- A-TileWidth --, therefor.